(12) United States Patent
Ishimaru

(10) Patent No.: US 7,037,232 B2
(45) Date of Patent: May 2, 2006

(54) MULTIPLE-SPEED TRANSMISSION FOR AUTOMOTIVE VEHICLE

(75) Inventor: Wataru Ishimaru, Kanagawa (JP)

(73) Assignee: Jatco LTD, Fuji (JP)

( * ) Notice: Subject to any disclaimer, the term of this patent is extended or adjusted under 35 U.S.C. 154(b) by 141 days.

(21) Appl. No.: 10/858,376

(22) Filed: Jun. 2, 2004

(65) Prior Publication Data
US 2004/0248694 A1   Dec. 9, 2004

(30) Foreign Application Priority Data
Jun. 4, 2003   (JP) .............................. 2003-158796

(51) Int. Cl.
F16H 3/62   (2006.01)
(52) U.S. Cl. ...................................... 475/275
(58) Field of Classification Search ................ 475/275, 475/276
See application file for complete search history.

(56) References Cited

U.S. PATENT DOCUMENTS 6,752,737 B1 * 6/2004 Ishimaru et al. ............ 475/275
6,827,664 B1 * 12/2004 Stevenson et al. .......... 475/275
6,878,087 B1 * 4/2005 Tsuga ........................ 475/284
6,863,635 B1 * 6/2005 Tsuga ........................ 475/275
6,905,434 B1 * 6/2005 Sugihara et al. ............ 475/276
6,918,852 B1 * 7/2005 Choi .......................... 475/284
6,935,985 B1 * 8/2005 Ishimaru .................... 475/296

FOREIGN PATENT DOCUMENTS

JP        182785        7/2001

OTHER PUBLICATIONS

U.S. Appl. No. 10/889,049, filed Jul. 13,2004, Ishimaru.

* cited by examiner

Primary Examiner—Dirk Wright
(74) Attorney, Agent, or Firm—Foley & Lardner LLP

(57) ABSTRACT

A multiple-speed transmission provides a wide gear ratio coverage for an automotive vehicle by using a basic structure of a six-speed transmission. The multiple-speed transmission is comprised of a combination of three planetary gearsets, three clutches, and three brakes. Each speed is established by applying two of six elements of three clutches and three brakes.

11 Claims, 25 Drawing Sheets

FIRST EMBODIMENT

FIRST EMBODIMENT

FIG.2

| | C1 | C2 | C3 | B1 | B2 | B3 | GEAR RATIO | 6-SPEED AT |
|---|---|---|---|---|---|---|---|---|
| 1ST | ● | | | ● | | | 3.84 | 1ST |
| 2ND | ● | | | | | ● | 2.80 | – |
| 3RD | ● | | | | ● | | 2.24 | 2ND |
| 4TH | ● | ● | | | | | 1.60 | 3RD |
| 5TH | ● | | ● | | | | 1.19 | 4TH |
| 6TH | | ● | ● | | | | 0.84 | 5TH |
| 7TH | | | ● | | ● | | 0.71 | 6TH |
| 8TH | | | ● | | | ● | 0.52 | – |
| REV1 | | ● | | ● | | | 4.00 | REV |
| REV2 | | ● | | | | ● | 1.39 | – |

RATIO COVERAGE OF 8-SPEED
    AUTOMATIC TRANSMISSION: 1ST/8TH 7.38
RATIO COVERAGE OF 6-SPEED
    AUTOMATIC TRANSMISSION: 1ST/6TH 5.41

$$\text{GEAR RATIO OF PLANETARY GEARSET} \begin{cases} \alpha_1 & 0.60 & S_1/R_1 \\ \alpha_2 & 0.40 & S_2/R_2 \\ \alpha_3 & 0.40 & S_3/R_3 \\ \alpha_4 & 0.35 & S_4/R_4 \end{cases}$$

POWER FLOW IN 1ST FIG. 4A
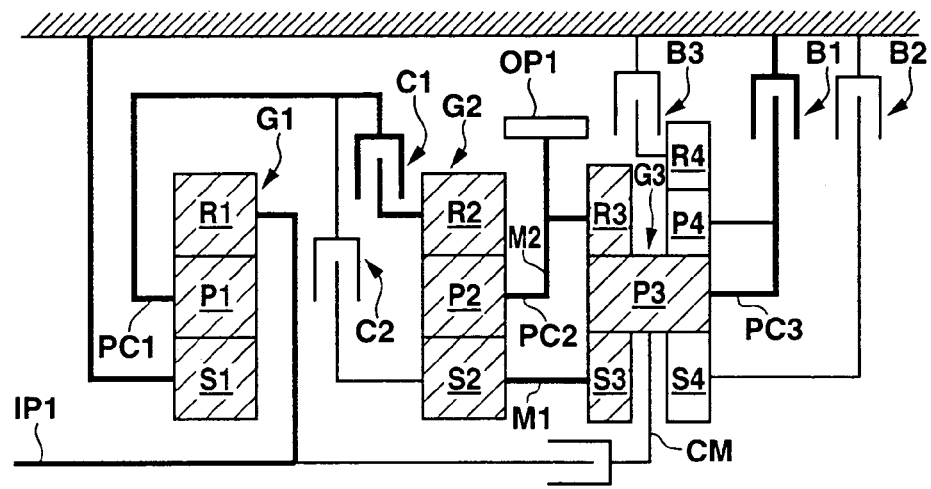
POWER FLOW IN 2ND FIG. 4B
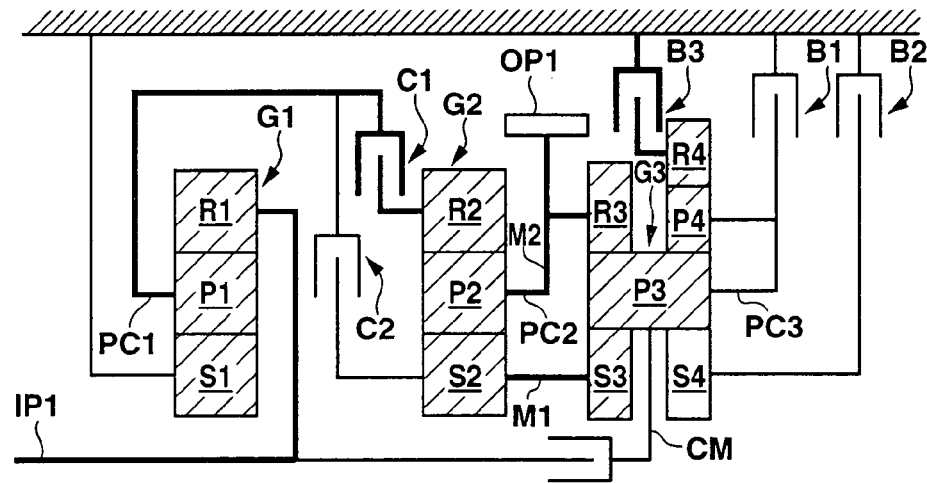
POWER FLOW IN 3RD FIG. 4C
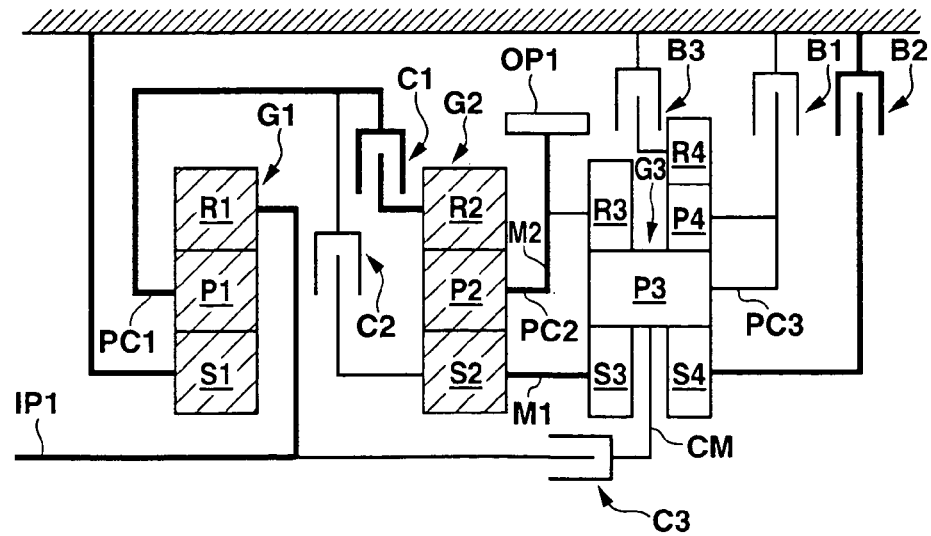

POWER FLOW IN 4TH FIG.5A
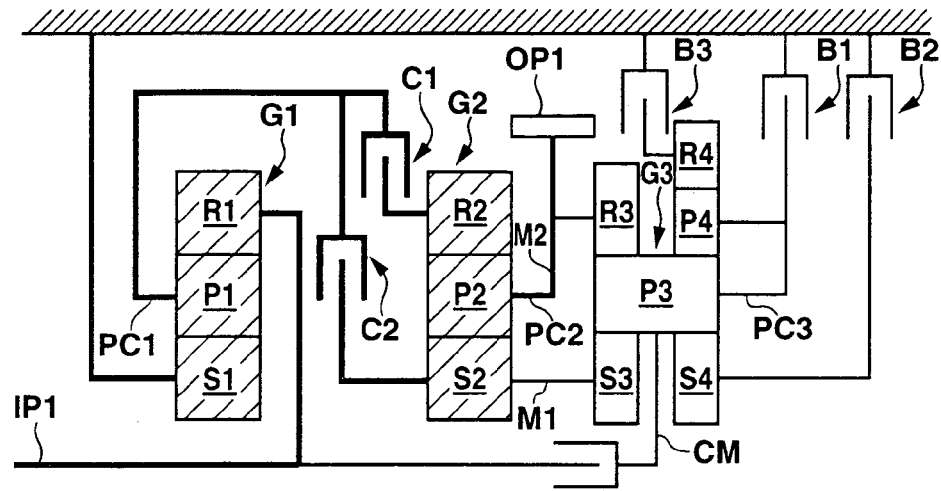
POWER FLOW IN 5TH FIG.5B
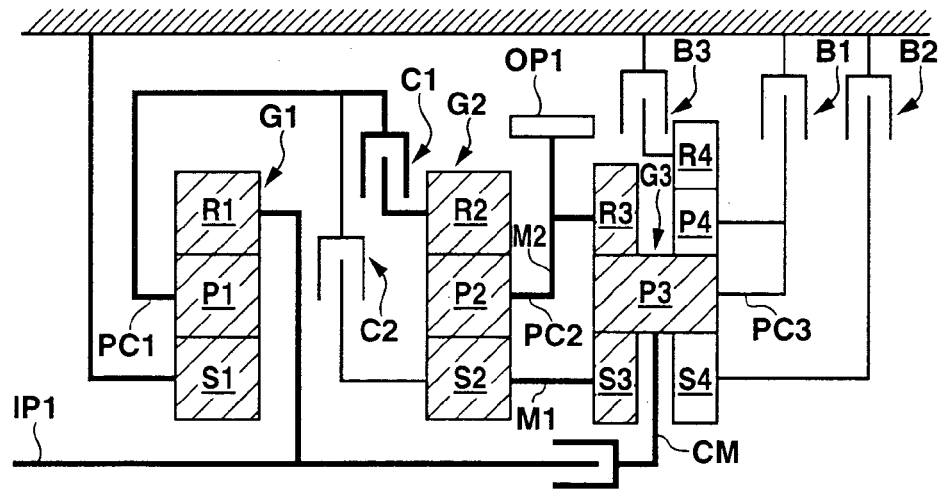
POWER FLOW IN 6TH FIG.5C
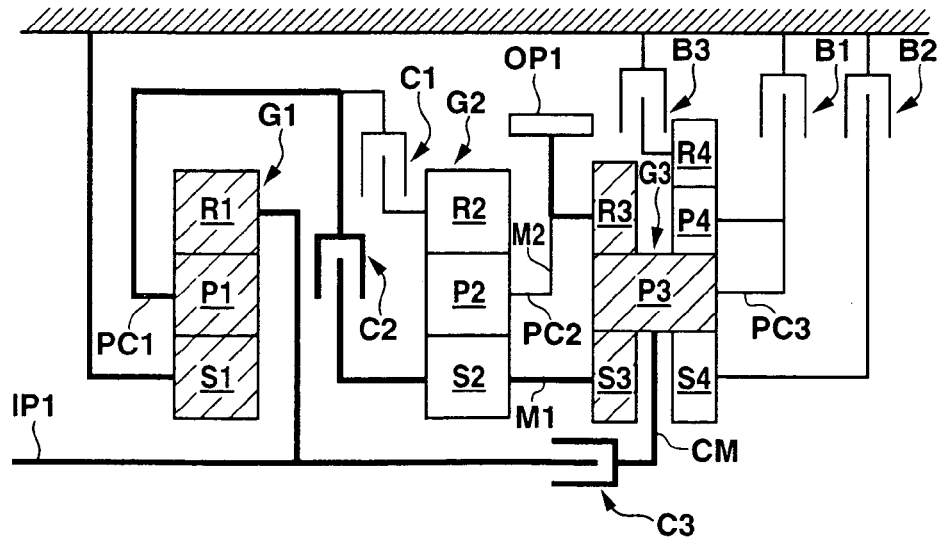

POWER FLOW IN 7TH FIG.6A
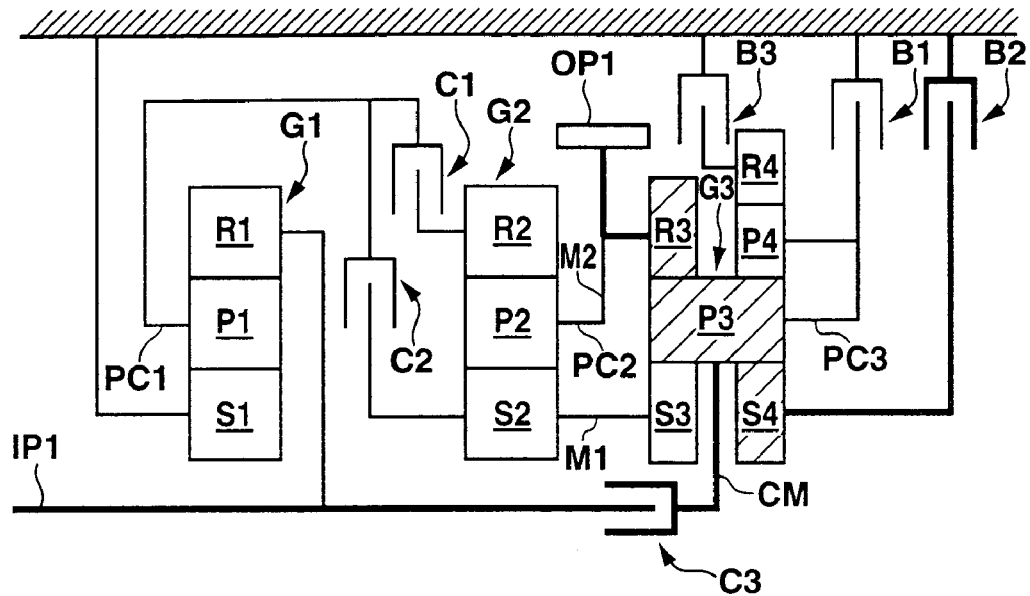
POWER FLOW IN 8TH FIG.6B
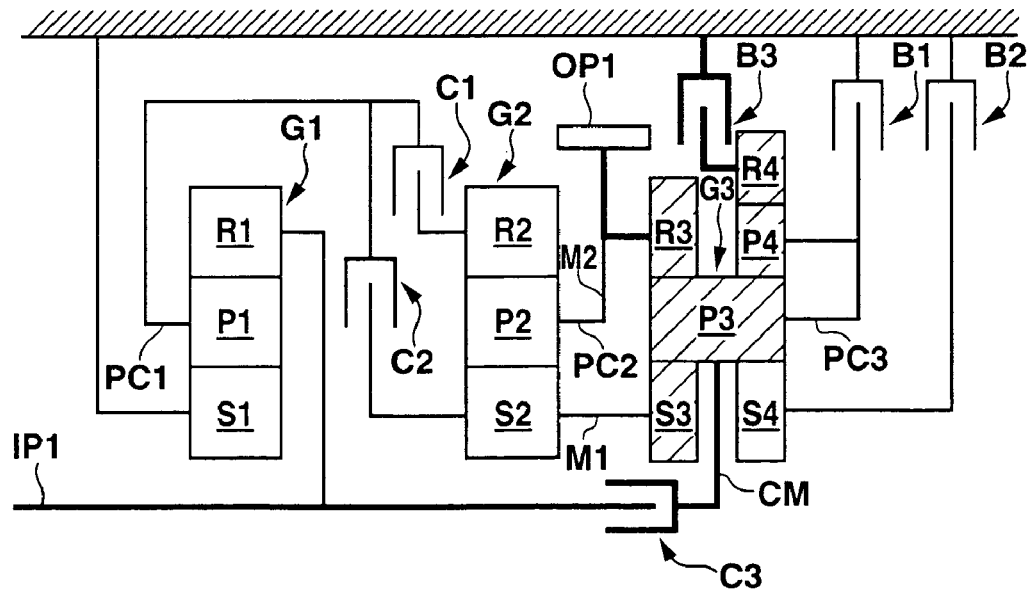

POWER FLOW IN 1ST REVERSE

POWER FLOW IN 2ND REVERSE

SECOND EMBODIMENT

POWER FLOW IN 1ST

POWER FLOW IN 2ND

POWER FLOW IN 3RD

POWER FLOW IN 4TH

POWER FLOW IN 5TH

POWER FLOW IN 6TH

POWER FLOW IN 7TH

POWER FLOW IN 8TH

POWER FLOW IN 1ST REVERSE

POWER FLOW IN 2ND REVERSE

POWER FLOW IN 1ST

POWER FLOW IN 2ND

POWER FLOW IN 3RD

POWER FLOW IN 4TH

POWER FLOW IN 5TH

POWER FLOW IN 6TH

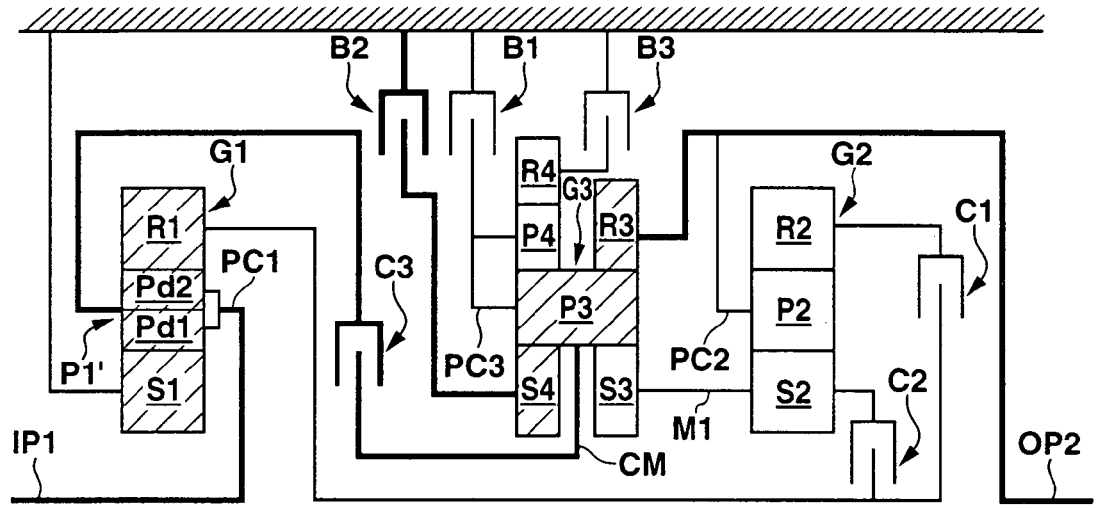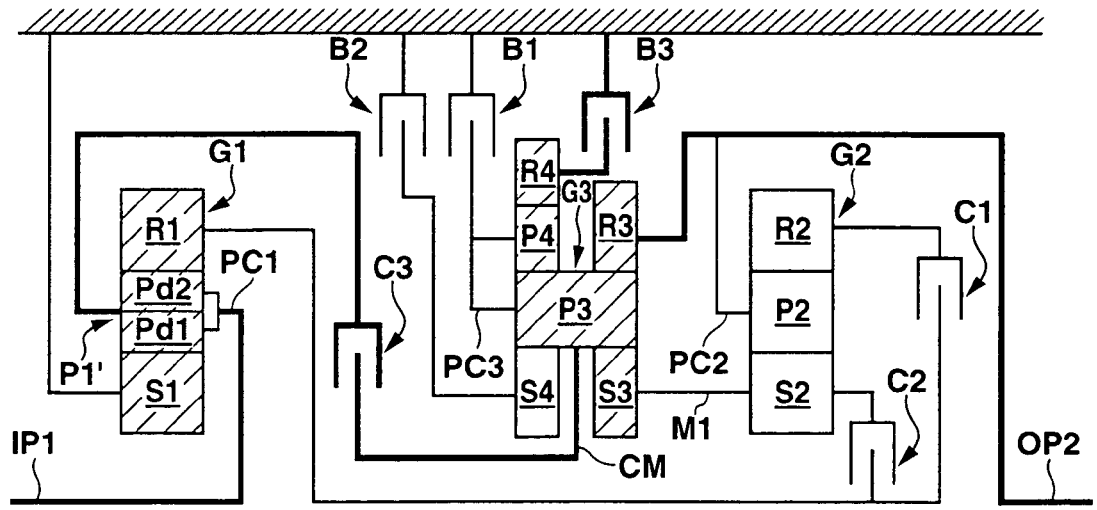

POWER FLOW IN 1ST REVERSE

POWER FLOW IN 2ND REVERSE

THIRD EMBODIMENT

POWER FLOW IN 1ST

POWER FLOW IN 2ND

POWER FLOW IN 3RD

POWER FLOW IN 4TH

POWER FLOW IN 5TH

POWER FLOW IN 6TH

POWER FLOW IN 1ST REVERSE

POWER FLOW IN 2ND REVERSE

MULTIPLE-SPEED TRANSMISSION FOR AUTOMOTIVE VEHICLE

BACKGROUND OF THE INVENTION

The present invention relates generally to multiple-speed transmissions for automotive vehicles, and more particularly to a gearbox of a multiple-speed automatic transmission for an automotive vehicle.

Recent years, there have been disclosed various multiple-speed transmissions with more than six forward speeds. One such transmission is disclosed in Japanese Patent Provisional Publication No. 2001-182785 published Jul. 6, 2001. In the publication, a six-speed transmission is comprised of a speed-reducing planetary gearset with one of the rotating members stationary, a Ravigneaux planetary gearset, three clutches, and two brakes. In addition, an eight-speed transmission is comprised by adding a forth clutch to the six-speed transmission.

SUMMARY OF THE INVENTION

In the aforementioned publication, the eight-speed transmission additionally provides a gear ratio between the third speed and the fourth speed, and another gear ratio between the fourth speed and the fifth speed of the six-speed transmission. Accordingly, the gear ratio coverage, that is, the gear ratio of the lowest speed divided by the gear ratio of the highest speed, of the transmission is not varied with the multiplication of gear ratios. However, increasing the gear ratio coverage is desired for improvement of fuel efficiency. With the aforementioned structure, it is difficult to provide wide gear ratio coverage by multiplication of gear ratios with common planetary gearsets.

Accordingly, it is an object of the present invention to provide a multiple-speed transmission for an automotive vehicle that includes a common basic structure and provides a wider gear ratio coverage by multiplication of gear ratios.

In order to accomplish the aforementioned and other objects of the present invention, a multiple-speed transmission for an automotive vehicle comprises an input section, an output section, a speed-reducing planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation, a speed-shifting planetary gearset including a first rotating member, a second rotating member drivingly connected to the output section, a third rotating member, a fourth rotating member, a fifth rotating member, and a sixth rotating member, for taking a rotation state determined by a combination of rotations of two of the six rotating members of the speed-shifting planetary gearset, where each of the six rotating members of the speed-shifting planetary gearset has a rotation speed that monotonously varies in order of the first rotating member, the second rotating member, the third rotating member, the sixth rotating member, and the two members of the fourth rotating member and the fifth rotating member, a first clutch for selectively drivingly connecting and disconnecting the first rotating element of the speed-reducing planetary gearset and the first rotating member of the speed-shifting planetary gearset, a second clutch for selectively drivingly connecting and disconnecting the first rotating element of the speed-reducing planetary gearset and the fourth rotating member of the speed-shifting planetary gearset, a third clutch for selectively drivingly connecting and disconnecting the second rotating element of the speed-reducing planetary gearset and the third rotating member of the speed-shifting planetary gearset, a first brake operable to hold selectively against rotation the third rotating member of the speed-shifting planetary gearset, a second brake operable to hold selectively against rotation the fifth rotating member of the speed-shifting planetary gearset, and a third brake operable to hold selectively against rotation the sixth rotating member of the speed-shifting planetary gearset.

According to another aspect of the invention, a multiple-speed transmission for an automotive vehicle comprises an input section, an output section, a first planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation, a second planetary gearset including a second sun gear, a second ring gear, a second planet-pinion carrier, and a second planet pinion rotatably supported on the second planet-pinion carrier and meshed with the second sun gear and the second ring gear, a third planetary gearset having a third sun gear connected to the second sun gear, a fourth sun gear, a third ring gear connected to the second planet-pinion carrier and the output section, a fourth ring gear, a third planet-pinion carrier including a center member between the third sun gear and the fourth sun gear, a third planet pinion rotatably supported on the third planet-pinion carrier and meshed with the third sun gear, the fourth sun gear, and the third ring gear, and a fourth planet pinion rotatably supported on the third planet-pinion carrier and meshed with the third planet pinion and the fourth ring gear, a first clutch for selectively drivingly connecting and disconnecting the first rotating element of the first planetary gearset and the second ring gear, a second clutch for selectively drivingly connecting and disconnecting the first rotating element of the first planetary gearset and at least one of the second sun gear and the third sun gear, a third clutch for selectively drivingly connecting and disconnecting the second rotating element of the first planetary gearset and the third planet-pinion carrier via the center member, a first brake operable to hold selectively against rotation the third planet-pinion carrier, a second brake operable to hold selectively against rotation the fourth sun gear, and a third brake operable to hold selectively against rotation the fourth ring gear.

According to a further aspect of the invention, a multiple-speed transmission for an automotive vehicle comprises an input section, an output section, a first planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation, a second planetary gearset including a second sun gear, a second ring gear, a second planet-pinion carrier connected to the output section, and a second planet pinion rotatably supported on the second planet-pinion carrier and meshed with the second sun gear and the second ring gear, a third planetary gearset having a third sun gear, a fourth sun gear, a fifth sun gear connected to the second sun gear, a third ring gear connected to the second planet-pinion carrier, a third planet-pinion carrier including a center member between the third sun gear and the fourth sun gear, and a third planet pinion rotatably supported on the third planet-pinion carrier, the third planet pinion formed of two portions with different diameters, and meshed with the fifth sun gear at one portion with a smaller diameter, and third sun gear, the fourth sun gear, and the third ring gear at the other portion, a first clutch for selectively drivingly connecting and disconnecting the first rotating element of the first planetary gearset and the second ring gear, a second clutch for selectively drivingly connecting and disconnecting the first rotating element of the first planetary gearset and the third sun gear, a third clutch for selectively drivingly connecting and disconnecting the second rotating element of the first planetary gearset and the third planet-pinion carrier via the center member, a first brake operable to hold selectively against rotation the third planet-pinion carrier, a second brake operable to hold selectively against rotation the fourth sun gear, and a third brake operable to hold selectively against rotation the second sun gear and the fifth sun gear.

According to a still further aspect of the invention, a multiple-speed transmission for an automotive vehicle comprises input means for receiving an input power, output means for outputting a transmitted power, speed-reducing means for including a first rotating element having a first primary speed ratio slower than the input means, a second rotating element drivingly connected to the input means and having a second primary speed ratio faster than the first primary speed ratio in the same direction as the first rotating element, and a third rotating element held against rotation, speed-shifting means for including a first rotating member, a second rotating member drivingly connected to the output means, a third rotating member, a fourth rotating member, a fifth rotating member, and a sixth rotating member, for taking a rotation state determined by a combination of rotations of two of the six rotating members of the speed-shifting means, where each of the six rotating members of the speed-shifting means has a rotation speed that monotonously varies in order of the first rotating member, the second rotating member, the third rotating member, the sixth rotating member, and the two members of the fourth rotating member and the fifth rotating member, first torque transmitting means for selectively drivingly connecting and disconnecting the first rotating element of the speed-reducing means and the first rotating member of the speed-shifting means, second torque transmitting means for selectively drivingly connecting and disconnecting the first rotating element of the speed-reducing means and the fourth rotating member of the speed-shifting means, third torque transmitting means for selectively drivingly connecting and disconnecting the second rotating element of the speed-reducing means and the third rotating member of the speed-shifting means, fourth torque transmitting means for holding selectively against rotation the third rotating member of the speed-shifting means, fifth torque transmitting means for holding selectively against rotation the fifth rotating member of the speed-shifting means, and sixth torque transmitting means for holding selectively against rotation the sixth rotating member of the speed-shifting means.

The above objects and other objects, features, and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

FIG. 2 is a diagram depicting clutch engagements and brake applications required to establish various gear speeds of the multiple-speed automatic transmission of the first embodiment.

FIG. 4A is a schematic diagram depicting a power flow in the first speed of the multiple-speed automatic transmission of the first embodiment.

FIG. 4B is a schematic diagram depicting a power flow in the second speed of the multiple-speed automatic transmission of the first embodiment.

FIG. 4C is a schematic diagram depicting a power flow in the third speed of the multiple-speed automatic transmission of the first embodiment.

FIG. 5A is a schematic diagram depicting a power flow in the fourth speed of the multiple-speed automatic transmission of the first embodiment.

FIG. 5B is a schematic diagram depicting a power flow in the fifth speed of the multiple-speed automatic transmission of the first embodiment.

FIG. 5C is a schematic diagram depicting a power flow in the sixth speed of the multiple-speed automatic transmission of the first embodiment.

FIG. 6A is a schematic diagram depicting a power flow in the seventh speed of the multiple-speed automatic transmission of the first embodiment.

FIG. 6B is a schematic diagram depicting a power flow in the eighth speed of the multiple-speed automatic transmission of the first embodiment.

FIG. 17A is a schematic diagram depicting a power flow in the seventh speed of the multiple-speed automatic transmission of the second variation of the second embodiment.

FIG. 17B is a schematic diagram depicting a power flow in the eighth speed of the multiple-speed automatic transmission of the second variation of the second embodiment.

DETAILED DESCRIPTION OF THE INVENTION

Figure 1:
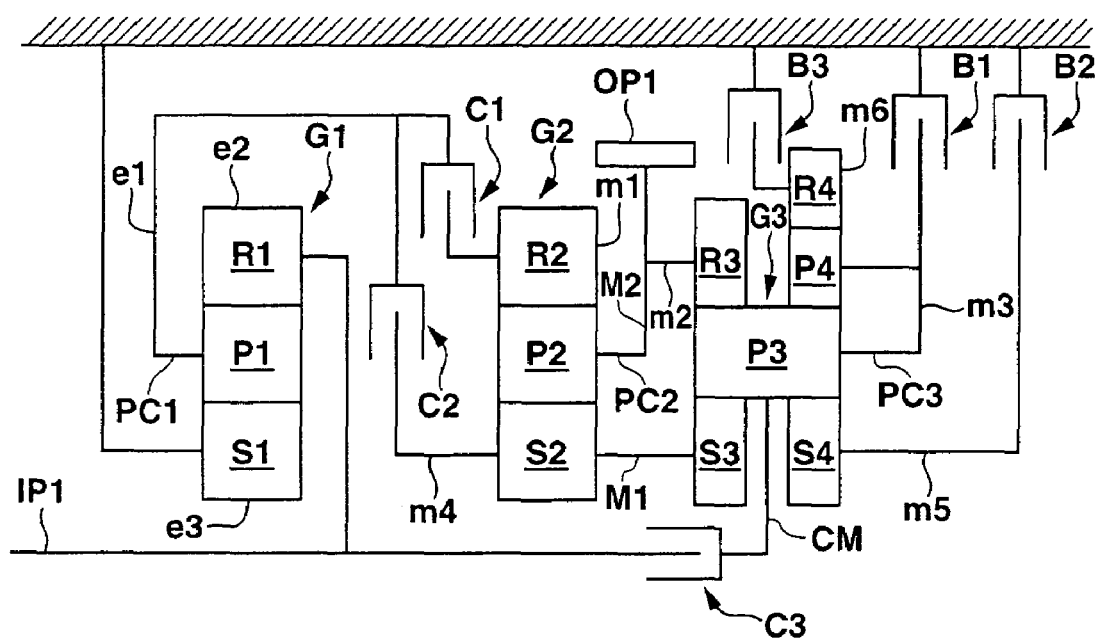
FIG. 1 is a schematic diagram depicting a multiple-speed automatic transmission for an automotive vehicle of a first embodiment.

Referring now to FIG. 1, there is shown a multiple-speed automatic transmission for an automotive vehicle of a first embodiment of the present invention. The multiple-speed automatic transmission provides eight forward speeds and two reverse speeds. The multiple-speed automatic transmission includes a first planetary gearset G1 at the left, a second planetary gearset G2 in the center, and a third planetary gearset G3 at the right. First planetary gearset G1 is of the single-pinion type, to serve for a speed-reducing planetary gearset as a speed-reducing unit. Second planetary gearset G2 is of the single-pinion type. Third planetary gearset G3 is of the double-sun-gear type. Second planetary gearset G2 and third planetary gearset G3 serve for a speed-shifting planetary gearset as a speed-shifting unit.

First planetary gearset G1, which is of the single-pinion type, consists of a first sun gear S1, a first ring gear R1, and a first planet-pinion carrier PC1 that carries or rotatably supports a first planet pinion P1 meshed with both first sun gear S1 and first ring gear R1. First sun gear S1 as a third rotating element e3 is continuously held against rotation to a transmission housing. First planet-pinion carrier PC1 serves for a first rotating element e1 of first planetary gearset G1 with a first primary speed ratio slower than that of first ring gear R1 that serves for a second rotating element e2 of first planetary gearset G1.

Second planetary gearset G2, which is of the single-pinion type, consists of a second sun gear S2, a second ring gear R2, and a second planet-pinion carrier PC2 that carries or rotatably supports a second planet pinion P2 meshed with both second sun gear S2 and second ring gear R2.

Third planetary gearset G3, which is of the double-sun-gear type, consists of two sun gears of a third sun gear S3 and a fourth sun gear S4, two ring gears of a third ring gear R3 and a fourth ring gear R4, and a third planet-pinion carrier PC3. Third planet-pinion carrier PC3 carries or rotatably supports two planet pinions of a third planet pinion P3 and a fourth planet pinion P4. Third planet pinion P3 is meshed with two sun gears of third sun gear S3 and fourth sun gear S4 and third ring gear R3. Fourth planet pinion P4 is meshed with third planet pinion P3 and fourth ring gear R4. Third planet-pinion carrier PC3 further includes a center member CM between third sun gear S3 and fourth sun gear S4 for transmitting rotation power. Incidentally, center member CM is connected to third planet-pinion carrier PC3 between pluralities of third planet pinion P3, to rotate solidly with a third rotating member m3.

In addition, a first connecting member M1 is provided between second planetary gearset G2 and third planetary gearset G3, for connecting second sun gear S2 and third sun gear S3 solidly to each other. A second connecting member M2 is provided between second planetary gearset G2 and third planetary gearset G3, for connecting second planet-pinion carrier PC2 and third ring gear R3 solidly to each other.

The speed-shifting planetary gearset, which consists of second planetary gearset G2 and third planetary gearset G3, includes six rotating members. A first rotating member m1 consists of elements that rotate solidly with second ring gear R2. A second rotating member m2 consists of elements that rotate solidly with second connecting member M2. The third rotating member m3 consists of elements that rotate solidly with third planet-pinion carrier PC3. A fourth rotating member m4 consists of elements that rotate solidly with second sun gear S2. A fifth rotating member m5 consists of elements that rotate solidly with fourth sun gear S4. A sixth rotating member m6 consists of elements that rotate solidly with fourth ring gear R4.

The aforementioned structure is connected to an input section, such as an input shaft IP1 and an output section, such as an output gear OP1. Input shaft IP1 is drivingly connected to first ring gear R1, to input driving torque transmitted via a torque converter (not shown) and others from an engine (not shown) as a drive source. Output gear OP1 is drivingly connected to second planet-pinion carrier PC2, to output driving torque via a final gear (not shown) and others to a driving wheel (not shown).

Additionally, the multiple-speed automatic transmission includes three clutches and three brakes. A first clutch C1 selectively connects or disconnects first planet-pinion carrier PC1 and second ring gear R2 or first rotating member m1. A second clutch C2 selectively connects or disconnects first planet-pinion carrier PC1 and second sun gear S2 or fourth rotating member m4. A third clutch C3 selectively connects or disconnects input shaft IP1 and center member CM or third rotating member m3. A first brake B1 is operable to selectively hold against rotation to the transmission housing or release third planet-pinion carrier PC3 (third rotating member m3). A second brake B2 is operable to selectively hold against rotation to the transmission housing or release fourth sun gear S4 (fifth rotating member m5). A third brake B3 is operable to selectively hold against rotation to the transmission housing or release fourth ring gear R4 (sixth rotating member m6).

Clutches C1, C2, and C3 and brakes B1, B2, and B3 are connected to a transmission control unit (not shown) as a transmission controlling means for supplying engaging pressure and releasing pressure according to clutch engagements and brake applications required to establish various gear speeds. The transmission control unit may be of the hydraulic control type, the electronic control type, or the electro-hydraulic control type.

Figure 3:
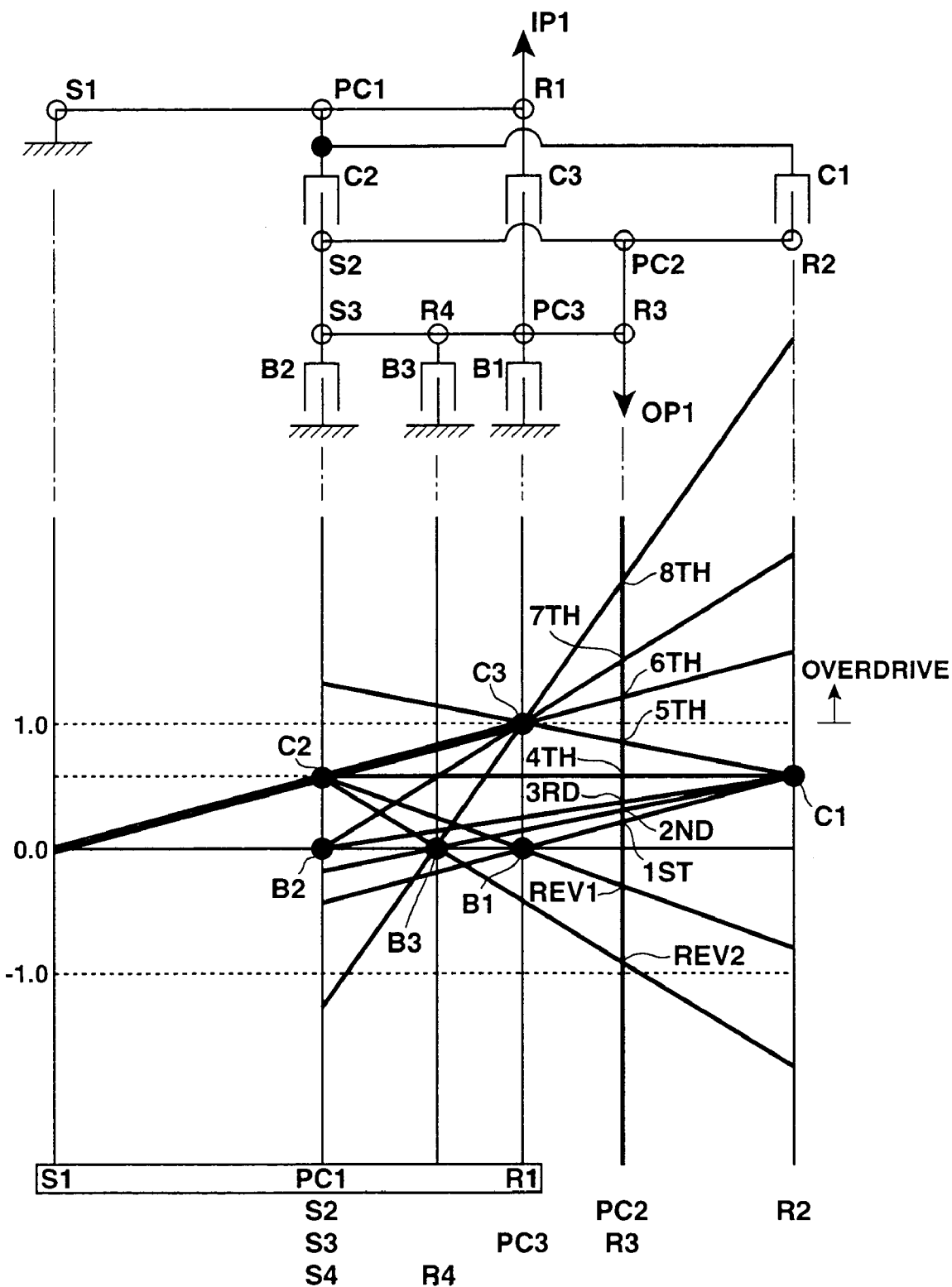
FIG. 3 is a collinear diagram of the multiple-speed automatic transmission of the first embodiment.

Referring now to FIGS. 2 through 7B, the following describes the operation of the multiple-speed automatic transmission of the first embodiment. FIG. 2 shows clutch engagements and brake applications required to establish various gear speeds. In FIG. 2, a solid circle in a cell indicates that the corresponding clutch or brake is applied in the corresponding speed, and a blank indicates that the corresponding clutch or brake is released in the corresponding speed. FIG. 3 shows the collinear diagram of the multiple-speed automatic transmission. The collinear diagram shows the rotation states of the rotating members in each speed. In FIG. 3, a bold line indicates the collinear diagram of first planetary gearset G1, and medium bold lines indicate the collinear diagrams of the speed-shifting planetary gearset including second planetary gearset G2 and third planetary gearset G3. The speed-shifting planetary gearset takes a rotation state determined by a combination of rotations of two of the six rotating members, where each of the six rotating members of the speed-shifting planetary gearset has a rotation speed that monotonously varies in order of first rotating member m1, second rotating member m2, third rotating member m3, sixth rotating member m6, and the two members of fourth rotating member m4 and fifth rotating member m5. FIGS. 4A to 7B show the power flow or the torque flow in each speed. In FIGS. 4A to 7B, the power flow through the clutches, the brakes, and the rotating members is indicated by bold lines, the power flow through the gears is indicated by a hatch pattern.

The first speed is established by engaging first clutch C1 and applying first brake B1, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. On the other hand, at third planetary gearset G3, with first brake B1 applied, third planet-pinion carrier PC3 is fixed to the transmission housing. With the rotation of third ring gear R3 or the output speed, third sun gear S3 rotates in the reverse direction at a reduced speed. Third sun gear S3 and second sun gear S2 of second planetary gearset G2 are solidly connected via first connecting member M1, so that the rotation speed of second sun gear S2 is the same as that of third sun gear S3. Accordingly, at second planetary gearset G2, second ring gear R2 rotates in the normal direction at a reduced speed and second sun gear S2 rotates in the reverse direction at a reduced speed. Therefore second planet-pinion carrier PC2 is forced to rotate at a speed further reduced from that of second ring gear R2, thereby outputs the rotation speed via second connecting member M2 to output gear OP1.

The collinear diagram of the multiple-speed automatic transmission as shown in FIG. 3 provides another analysis of the first speed. The point identified by C1 in the diagram, or the engagement point of first clutch C1 indicates the engagement of first clutch C1 with which the reduced speed is input to second ring gear R2 from first planetary gearset G1. The point identified by B1 in the diagram, or the application point of first brake B1 indicates the application of first brake B1 with which third planet-pinion carrier PC3 is held stationary. The operation of the speed-shifting planetary gearset is defined by the lever or straight line connecting the engagement point of first clutch C1 and the application point of first brake B1. The intersection point of the lever and the perpendicular line at output gear OP1 indicates the output speed. In the first speed, the rotation speed of input shaft IP1 is reduced to a point identified by 1ST in the diagram through the multiple-speed automatic transmission, and output to output gear OP1.

The power flow or torque flow in the first speed is shown in FIG. 4A. The power flows through first clutch C1, first brake B1, and the rotating members, as shown by bold lines, first planetary gearset G1, second planetary gearset G2, and third planetary gearset G3 except fourth sun gear S4, fourth planet pinion P4, and fourth ring gear R4, as shown by a hatch pattern. In this speed, first planetary gearset G1, second planetary gearset G2, and third planetary gearset G3 serve for the transmission of power and torque.

The second speed is established by releasing first brake B1 and applying third brake B3 to the operational state of the first speed, that is, by engaging first clutch C1 and applying third brake B3, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. On the other hand, at third planetary gearset G3, with third brake B3 applied, fourth ring gear R4 is fixed to the transmission housing. With the rotation of third ring gear R3 or the output speed, third sun gear S3 rotates in the reverse direction at a reduced speed (slower than that of the first speed). Third sun gear S3 and second sun gear S2 of second planetary gearset G2 are solidly connected via first connecting member M11 so that the rotation speed of second sun gear S2 is the same as that of third sun gear S3. Accordingly, at second planetary gearset G2, second ring gear R2 rotates in the normal direction at a reduced speed and second sun gear S2 rotates in the reverse direction at a reduced speed. On the other hand, at third planetary gearset G3, the rotation of third planet-pinion carrier PC3 is defined by the rotations of fourth ring gear R4 and third sun gear S3, and the rotation of third ring gear R3 is defined by the rotations of third sun gear S3 and third planet-pinion carrier PC3. Therefore second planet-pinion carrier PC2 and third ring gear R3 are forced to rotate at a speed further reduced from that of second ring gear R2, thereby output the rotation speed via second connecting member M2 to output gear OP1.

The collinear diagram of the multiple-speed automatic transmission as shown in FIG. 3 provides another analysis of the second speed. The point identified by C1 in the diagram, or the engagement point of first clutch C1 indicates the engagement of first clutch C1 with which the reduced speed is input to second ring gear R2 from first planetary gearset G1. The point identified by B3 in the diagram, or the application point of third brake B3 indicates the application of third brake B3 with which fourth ring gear R4 is held stationary. The operation of the speed-shifting planetary gearset is defined by the lever or straight line connecting the engagement point of first clutch C1 and the application point of third brake B3. The intersection point of the lever and the perpendicular line at output gear OP1 indicates the output speed. In the second speed, the rotation speed of input shaft IP1 is reduced to a point identified by 2ND in the diagram through the multiple-speed automatic transmission, and output to output gear OP1.

The power flow or torque flow in the second speed is shown in FIG. 4B. The power flows through first clutch C1, third brake B3, and the rotating members, as shown by bold lines, first planetary gearset G1, second planetary gearset G2, and third planetary gearset G3 except fourth sun gear S4, as shown by a hatch pattern. In this speed, first planetary gearset G1, second planetary gearset G2, and third planetary gearset G3 serve for the transmission of power and torque.

The third speed is established by releasing third brake B3 and applying second brake B2 to the operational state of the second speed, that is, by engaging first clutch C1 and applying second brake B2, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. On the other hand, at third planetary gearset G3, with second brake B2 applied, fourth sun gear S4 is fixed to the transmission housing. Third planet pinion P3, meshed with both third sun gear S3 and fourth sun gear S4, holds third sun gear S3 stationary according to the rotational state of fourth sun gear S4. Furthermore, second sun gear S2, solidly connected with third sun gear S3 via first connecting member M1, is held stationary to the transmission housing. Accordingly, at second planetary gearset G2, second ring gear R2 rotates at a reduced speed and second sun gear S2 is stationary. Therefore second planet-pinion carrier PC2 is forced to rotate at a speed further reduced from that of second ring gear R2, thereby outputs the rotation speed via second connecting member M2 to output gear OP1.

The collinear diagram of the multiple-speed automatic transmission as shown in FIG. 3 provides another analysis of the third speed. The point identified by C1 in the diagram, or the engagement point of first clutch C1 indicates the engagement of first clutch C1 with which the reduced speed is input to second ring gear R2 from first planetary gearset G1. The point identified by B2 in the diagram, or the application point of second brake B2 indicates the application of second brake B2 with which fourth sun gear S4 is held stationary. The operation of the speed-shifting planetary gearset is defined by the lever or straight line connecting the engagement point of first clutch C1 and the application point of second brake B2. The intersection point of the lever and the perpendicular line at output gear OP1 indicates the output speed. In the third speed, the rotation speed of input shaft IP1 is reduced to a point identified by 3RD in the diagram (faster than the second speed) through the multiple-speed automatic transmission, and output to output gear OP1.

The power flow or torque flow in the second speed is shown in FIG. 4C. The power flows through first clutch C1, second brake B2, and the rotating members, as shown by bold lines, first planetary gearset G1 and second planetary gearset G2, as shown by a hatch pattern.

The fourth speed is established by releasing second brake B2 and engaging second clutch C2 to the operational state of the third speed, that is, by engaging first clutch C1 and second clutch C2, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. At the same time, with second clutch C2 engaged, the reduced speed is input to second sun gear S2 from first planet-pinion carrier PC1 of first planetary gearset G1. Accordingly, at second planetary gearset G2, second ring gear R2 and second sun gear S2 rotate at the same reduced speed, so that second planet-pinion carrier PC2 rotates solidly with second ring gear R2 and second sun gear S2. Therefore second planet-pinion carrier PC2 is forced to rotate at the reduced speed that is reduced at first planetary gearset G1, thereby outputs the rotation speed via second connecting member M2 to output gear OP1.

The collinear diagram of the multiple-speed automatic transmission as shown in FIG. 3 provides another analysis of the fourth speed. The point identified by C1 in the diagram, or the engagement point of first clutch C1 indicates the engagement of first clutch C1 with which the reduced speed is input to second ring gear R2 from first planetary gearset G1. Similarly, the point identified by C2 in the diagram, or the engagement point of second clutch C2 indicates the engagement of second clutch C2 with which the reduced speed is input to second sun gear S2 from first planetary gearset G1. The operation of the speed-shifting planetary gearset is defined by the lever or straight line connecting the engagement point of first clutch C1 and the engagement point of second clutch C2. The intersection point of the lever and the perpendicular line at output gear OP1 indicates the output speed. In the fourth speed, the rotation speed of input shaft IP1 is reduced to a point identified by 4TH in the diagram (to the gear ratio of first planetary gearset G1) through the multiple-speed automatic transmission, and output to output gear OP1.

The power flow or torque flow in the second speed is shown in FIG. 5A. The power flows through first clutch C1, second clutch C2, and the rotating members, as shown by bold lines, first planetary gearset G1 and second planetary gearset G2, as shown by a hatch pattern.

The fifth speed is established by disengaging second clutch C2 and engaging third clutch C3 to the operational state of the fourth speed, that is, by engaging first clutch C1 and third clutch C3, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. On the other hand, at third planetary gearset G3, with third clutch C3 engaged, the input rotation of input shaft IP1 is input to third planet-pinion carrier PC3 via center member CM. Accordingly, with the rotation of third ring gear R3 or the output speed, third sun gear S3 rotates at a speed increased faster than that of third ring gear R3. Third sun gear S3 and second sun gear S2 of second planetary gearset G2 are solidly connected via first connecting member M1, so that the rotation speed of second sun gear S2 is the same as that of third sun gear S3. Accordingly, at second planetary gearset G2, second ring gear R2 rotates at a reduced speed and second sun gear S2 rotates at the faster speed. Therefore second planet-pinion carrier PC2 is forced to rotate at a speed increased from the speed reduced at first planetary gearset G1 (but slower than the input speed), thereby outputs the rotation speed via second connecting member M2 to output gear OP1.

The collinear diagram of the multiple-speed automatic transmission as shown in FIG. 3 provides another analysis of the fifth speed. The point identified by C1 in the diagram, or the engagement point of first clutch C1 indicates the engagement of first clutch C1 with which the reduced speed is input to second ring gear R2 from first planetary gearset G1. Similarly, the point identified by C3 in the diagram, or the engagement point of third clutch C3 indicates the engagement of third clutch C3 with which the input speed is input to third planet-pinion carrier PC3 from input shaft IP1. The operation of the speed-shifting planetary gearset is defined by the lever or straight line connecting the engagement point of first clutch C1 and the engagement point of third clutch C3. The intersection point of the lever and the perpendicular line at output gear OP1 indicates the output speed. In the fifth speed, the rotation speed of input shaft IP1 is reduced slightly to a point identified by 5TH in the diagram through the multiple-speed automatic transmission, and output to output gear OP1.

The power flow or torque flow in the fifth speed is shown in FIG. 5B. The power flows through first clutch C1, third clutch C3, and the rotating members, as shown by bold lines, first planetary gearset G1, second planetary gearset G2, and third planetary gearset G3 except fourth sun gear S4, fourth planet pinion P4, and fourth ring gear R4, as shown by a hatch pattern.

The sixth speed is established by disengaging first clutch C1 and engaging second clutch C2 to the operational state of the fifth speed, that is, by engaging second clutch C2 and third clutch C3, as shown in FIG. 2. First, the rotation speed of input shaft IP1 is reduced at first planetary gearset G1. With second clutch C2 engaged, the reduced speed is input to third sun gear S3 from first planet-pinion carrier PC1 of first planetary gearset G1 via second sun gear S2 and first connecting member M1. At the same time, with third clutch C3 engaged, the input rotation of input shaft IP1 is input to third planet-pinion carrier PC3 via center member CM. Accordingly, at third planetary gearset G3, third planet-pinion carrier PC3 rotates at the input speed and third sun gear S3 rotates at the speed reduced at first planetary gearset G1. Therefore third ring gear R3 is forced to rotate at a speed increased faster than the input speed, thereby outputs the increased rotation speed via second connecting member M2 to output gear OP1.

The collinear diagram of the multiple-speed automatic transmission as shown in FIG. 3 provides another analysis of the sixth speed. The point identified by C2 in the diagram, or the engagement point of second clutch C2 indicates the engagement of second clutch C2 with which the reduced speed is input to third sun gear S3 from first planetary gearset G1. Similarly, the point identified by C3 in the diagram, or the engagement point of third clutch C3 indicates the engagement of third clutch C3 with which the input speed is input to third planet-pinion carrier PC3 from input shaft IP1. The operation of the speed-shifting planetary gearset is defined by the lever or straight line connecting the engagement point of second clutch C2 and the engagement point of third clutch C3. The intersection point of the lever and the perpendicular line at output gear OP1 indicates the output speed. In the sixth speed, the rotation speed of input shaft IP1 is increased slightly to a point identified by 6TH in the diagram through the multiple-speed automatic transmission, and output to output gear OP1.

The power flow or torque flow in the sixth speed is shown in FIG. 5C. The power flows through second clutch C2, third clutch C3, and the rotating members, as shown by bold lines, first planetary gearset G1 and third planetary gearset G3 except fourth sun gear S4, fourth planet pinion P4, and fourth ring gear R4, as shown by a hatch pattern.

The seventh speed is established by disengaging second clutch C2 and applying second brake B2 to the operational state of the sixth speed, that is, by engaging third clutch C3 and applying second brake B2, as shown in FIG. 2. With third clutch C3 engaged, the input rotation speed of input shaft IP1 is input to third planet-pinion carrier PC3 of third planetary gearset G3 via center member CM. On the other hand, with second brake B2 applied, fourth sun gear S4 of third planetary gearset G3 is held stationary to the transmission housing. Accordingly, at third planetary gearset G3, third planet-pinion carrier PC3 rotates at the input speed and fourth sun gear S4 is stationary to the transmission housing. Therefore third ring gear R3 is forced to rotate at a speed increased faster than the input speed, thereby outputs the rotation speed via second connecting member M2 to output gear OP1.

The collinear diagram of the multiple-speed automatic transmission as shown in FIG. 3 provides another analysis of the seventh speed. The point identified by C3 in the diagram, or the engagement point of third clutch C3 indicates the engagement of third clutch C3 with which the input speed is input to third planet-pinion carrier PC3 from input shaft IP1. The point identified by B2 in the diagram, or the application point of second brake B2 indicates the application of second brake B2 with which fourth sun gear S4 is held stationary. The operation of the speed-shifting planetary gearset is defined by the lever or straight line connecting the engagement point of third clutch C3 and the application point of second brake B2. The intersection point of the lever and the perpendicular line at output gear OP1 indicates the output speed. In the seventh speed, the rotation speed of input shaft IP1 is increased to a point identified by 7TH in the diagram through the multiple-speed automatic transmission, and output to output gear OP1.

The power flow or torque flow in the seventh speed is shown in FIG. 6A. The power flows through third clutch C3, second brake B2, and the rotating members, as shown by bold lines, third planetary gearset G3 except third sun gear S3, fourth planet pinion P4, and fourth ring gear R4, as shown by a hatch pattern.

The eighth speed is established by releasing second brake B2 and applying third brake B3 to the operational state of the seventh speed, that is, by engaging third clutch C3 and applying third brake B3, as shown in FIG. 2. With third clutch C3 engaged, the input rotation speed of input shaft IP1 is input to third planet-pinion carrier PC3 of third planetary gearset G3 via center member CM. On the other hand, with third brake B3 applied, fourth ring gear R4 of third planetary gearset G3 is held stationary to the transmission housing. Accordingly, at third planetary gearset G3, third planet-pinion carrier PC3 rotates at the input speed and fourth ring gear R4 is stationary to the transmission housing. This defines the rotation of fourth sun gear S4, and thereby defines the rotation of third sun gear S3 that rotates solidly with fourth sun gear S4. Therefore third ring gear R3 is forced to rotate at a speed defined and increased faster than the input speed by the rotations of third sun gear S3 and third planet-pinion carrier PC3, thereby outputs the rotation speed via second connecting member M2 to output gear OP1.

The collinear diagram of the multiple-speed automatic transmission as shown in FIG. 3 provides another analysis of the eighth speed. The point identified by C3 in the diagram, or the engagement point of third clutch C3 indicates the engagement of third clutch C3 with which the input speed is input to third planet-pinion carrier PC3 from input shaft IP1. The point identified by B3 in the diagram, or the application point of third brake B3 indicates the application of third brake B3 with which fourth ring gear R4 is held stationary to the transmission housing. The operation of the speed-shifting planetary gearset is defined by the lever or straight line connecting the engagement point of third clutch C3 and the application point of third brake B3. The intersection point of the lever and the perpendicular line at output gear OP1 indicates the output speed. In the eighth speed, the rotation speed of input shaft IP1 is increased to a point identified by 8TH in the diagram through the multiple-speed automatic transmission, and output to output gear OP1.

The power flow or torque flow in the eighth speed is shown in FIG. 6B. The power flows through third clutch C3, third brake B3, and the rotating members, as shown by bold lines, third planetary gearset G3 except fourth sun gear S4, as shown by a hatch pattern.

The first reverse speed is established by engaging second clutch C2 and applying first brake B1, as shown in FIG. 2. First, the rotation speed of input shaft IP1 is reduced at first planetary gearset G1. With second clutch C2 engaged, the reduced speed is input to third sun gear S3 from first planet-pinion carrier PC1 of first planetary gearset G1 via second sun gear S2 and first connecting member M1. On the other hand, with first brake B1 applied, third planet-pinion carrier PC3 is fixed to the transmission housing. Accordingly, at third planetary gearset G3, third sun gear S3 rotates in the normal direction at the reduced speed and third planet-pinion carrier PC3 is held stationary to the transmission housing. Therefore third ring gear R3 is forced to rotate in the reverse direction at a reduced speed, thereby outputs the rotation speed via second connecting member M2 to output gear OP1.

The collinear diagram of the multiple-speed automatic transmission as shown in FIG. 3 provides another analysis of the first reverse speed. The point identified by C2 in the diagram, or the engagement point of second clutch C2 indicates the engagement of second clutch C2 with which the reduced speed is input to third sun gear S3 from first planetary gearset G1. The point identified by B1 in the diagram, or the application point of first brake B1 indicates the application of first brake B1 with which third planet-pinion carrier PC3 is held stationary. The operation of the speed-shifting planetary gearset is defined by the lever or straight line connecting the engagement point of second clutch C2 and the application point of first brake B1. The intersection point of the lever and the perpendicular line at output gear OP1 indicates the output speed. In the first reverse speed, the rotation speed of input shaft IP1 is reduced to a point identified by REV1 in the diagram through the multiple-speed automatic transmission, and output to output gear OP1.

Figure 7A:
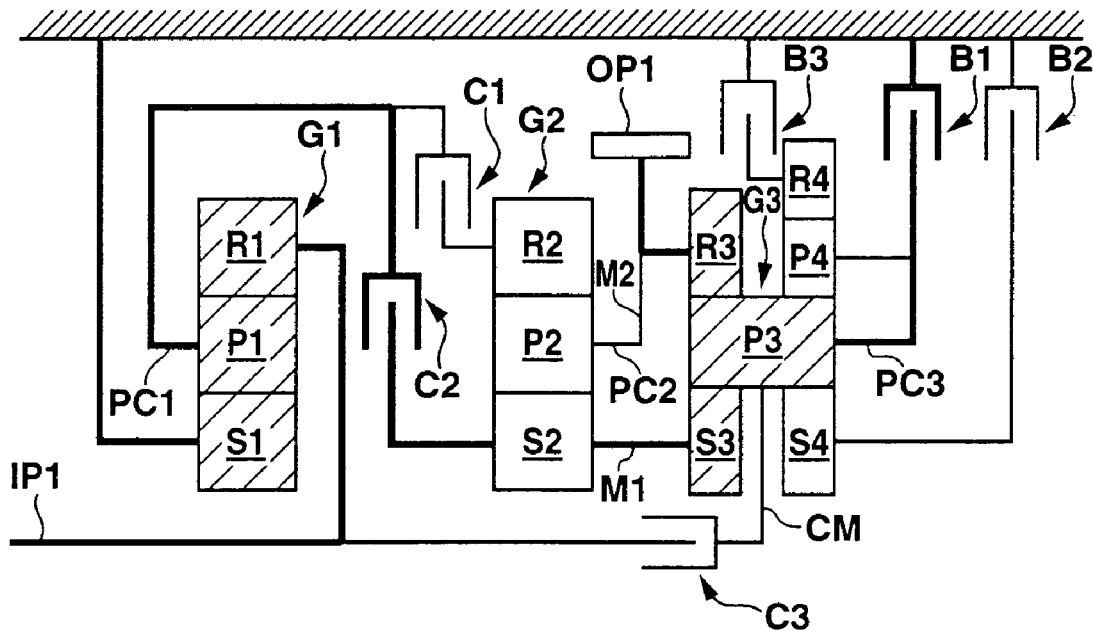
FIG. 7A is a schematic diagram depicting a power flow in the first reverse speed of the multiple-speed automatic transmission of the first embodiment.

The power flow or torque flow in the first reverse speed is shown in FIG. 7A. The power flows through second clutch C2, first brake B1, and the rotating members, as shown by bold lines, first planetary gearset G1 and third planetary gearset G3 except fourth sun gear S4, fourth planet pinion P4, and fourth ring gear R4, as shown by a hatch pattern.

The second reverse speed is established by releasing first brake B1 and applying third brake B3 to the operational state of the first reverse speed, that is, by engaging second clutch C2 and applying third brake B3, as shown in FIG. 2. First, the rotation speed of input shaft IP1 is reduced at first planetary gearset G1. With second clutch C2 engaged, the reduced speed is input to third sun gear S3 from first planet-pinion carrier PC1 of first planetary gearset G1 via second sun gear S2 and first connecting member M1. On the other hand, with third brake B3 applied, fourth ring gear R4 is fixed to the transmission housing. Accordingly, at third planetary gearset G3, third sun gear S3 rotates in the normal direction at the reduced speed and fourth ring gear R4 is held stationary to the transmission housing. This defines the rotation of third planet-pinion carrier PC3. Therefore third ring gear R3 is forced to rotate in the reverse direction at a reduced speed (faster than that of the first reverse speed) defined by the rotations of third sun gear S3 and third planet-pinion carrier PC3, thereby outputs the rotation speed via second connecting member M2 to output gear OP1.

The collinear diagram of the multiple-speed automatic transmission as shown in FIG. 3 provides another analysis of the second reverse speed. The point identified by C2 in the diagram, or the engagement point of second clutch C2 indicates the engagement of second clutch C2 with which the reduced speed is input to third sun gear S3 from first planetary gearset G1. The point identified by B3 in the diagram, or the application point of third brake B3 indicates the application of third brake B3 with which fourth ring gear R4 is held stationary. The operation of the speed-shifting planetary gearset is defined by the lever or straight line connecting the engagement point of second clutch C2 and the application point of third brake B3. The intersection point of the lever and the perpendicular line at output gear OP1 indicates the output speed. In the second reverse speed, the rotation speed of input shaft IP1 is reduced to a point identified by REV2 in the diagram through the multiple-speed automatic transmission, and output to output gear OP1.

Figure 7B:
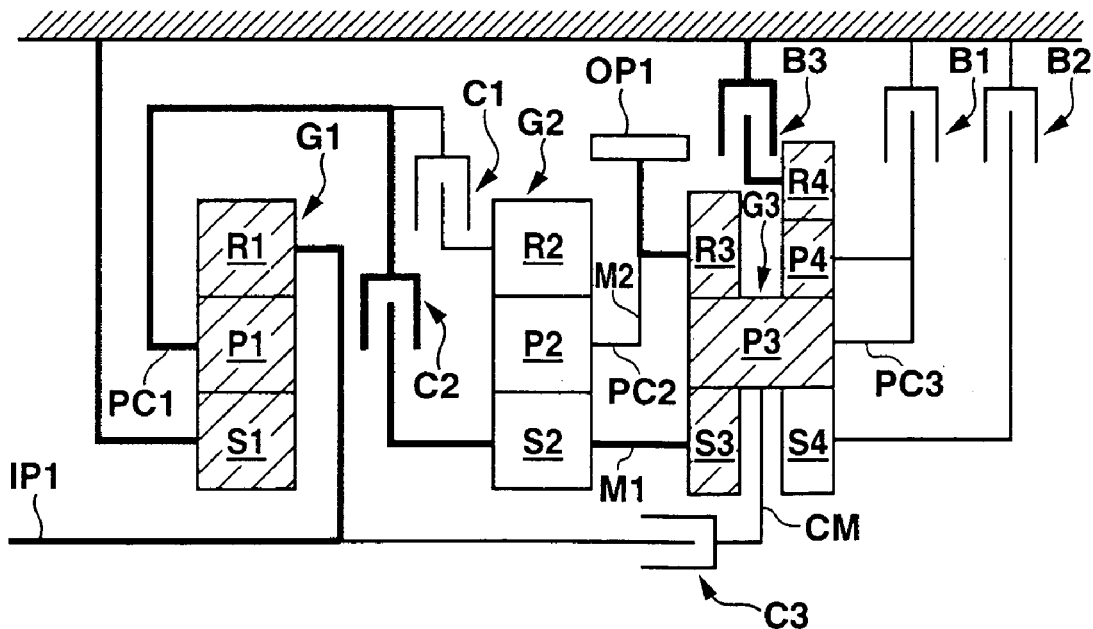
FIG. 7B is a schematic diagram depicting a power flow in the second reverse speed of the multiple-speed automatic transmission of the first embodiment.

The power flow or torque flow in the second reverse speed is shown in FIG. 7B. The power flows through second clutch C2, third brake B3, and the rotating members, as shown by bold lines, first planetary gearset G1 and third planetary gearset G3 except fourth sun gear S4, as shown by a hatch pattern.

Figure 25:
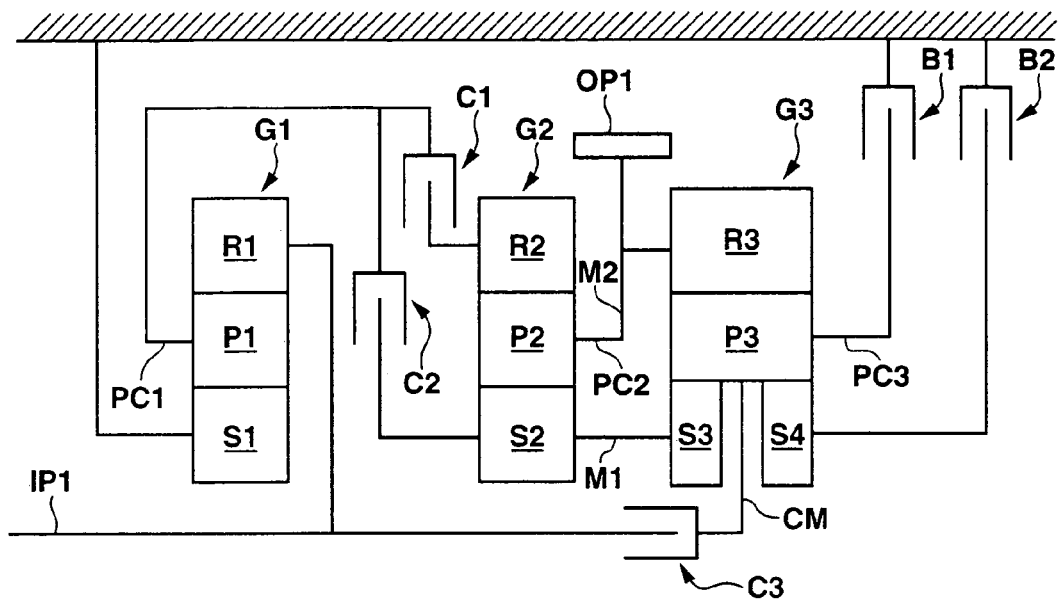
FIG. 25 is a schematic diagram depicting a six-speed automatic transmission as a basic structure for the eight-speed automatic transmission of the first embodiment.

The multiple-speed automatic transmission of the first embodiment is constructed and operated as discussed above. The following describes the comparison between the multiple-speed automatic transmission of the first embodiment and the corresponding six-speed automatic transmission that serves for the basic structure of the multiple-speed automatic transmission of the first embodiment. Referring now to FIG. 25, there is shown the six-speed automatic transmission. Elements in common are designated by the same reference signs. The six-speed automatic transmission includes three planetary gearsets G1, G2, and G3, three clutches C1 through C3, and two brakes B1 and B2. The difference is that the multiple-speed automatic transmission includes additional elements of fourth planet pinion P4 and fourth ring gear R4 of third planetary gearset G3, and third brake B3. In other words, simply adding fourth planet pinion P4 and fourth ring gear R4 of third planetary gearset G3, and third brake B3 serves for multiplication of gear speeds from the six-speed automatic transmission to the eight-speed automatic transmission of the first embodiment.

The following describes effects of the first embodiment. (E1) The eight-speed automatic transmission of the first embodiment is comprised by adding fourth planet pinion P4, fourth ring gear R4 of third planetary gearset G3, and third brake B3 to the corresponding six-speed automatic transmission. As shown in FIG. 2, a gear speed between the first speed and the second speed of the corresponding six-speed automatic transmission is provided by engaging first clutch C1 and applying third brake B3. In addition, a gear speed faster than the sixth speed of the corresponding six-speed automatic transmission is provided by engaging third clutch C3 and applying third brake B3. In summary, an eight-speed automatic transmission can be provided by applying planetary gearsets with the same gear ratio as the corresponding six-speed automatic transmission, while the gear ratios can be properly set. Addition of the top speed or the eighth speed provides a wider ratio coverage without unnecessarily lowering the first gear speed, to improve fuel efficiency, which is an object of multiplication of gear speeds. As shown in FIG. 2, for example, the ratio coverage of the automatic transmission of the first embodiment is increased to 7.38, while the ratio coverage of the six-speed automatic transmission is equal to 5.41. This is derived from the gear ratios of the planetary gearsets. In this example, the gear ratios of $\alpha 1$ or first sun gear S1/first ring gear R1 gear ratio, $\alpha 2$ or second sun gear S2/second ring gear R2 gear ratio, $\alpha 3$ or third sun gear S3/third ring gear R3, and $\alpha 4$ or fourth sun gear S4/fourth ring gear R4 gear ratio are equal to 0.60, 0.40, 0.40, and 0.35, respectively.

(E2) The new second speed is added between the first speed and the second speed of the corresponding six-speed automatic transmission, where torque difference is large, to reduce torque difference and shift shock. As shown in FIG. 2, the difference of gear ratio between the first speed and the second speed of the eight-speed automatic transmission of the first embodiment is equal to 1.04, and the difference between the second and the third is equal to 0.56, while the difference of gear ratio between the first speed and the second speed of the corresponding six-speed automatic transmission is equal to 1.6. Accordingly, this provides smoother shifting from the first speed to the second speed. On the other hand, addition of the new second speed leads to lowering the minimum speed for lock-up, to improve fuel efficiency. In general, the first speed is used during starting from a stationary state, without lock-up, from the viewpoint of fail-safe operation. In other words, decreasing the second speed that usually determines the minimum speed for lock-up, or increasing the gear ratio of the second leads to a low minimum speed for lock-up and improvement of fuel efficiency.

(E3) An additional reverse speed faster than the reverse speed of the corresponding six-speed automatic transmission is provided. The new reverse speed is established by engaging second clutch C2 and applying third brake B3, as discussed above.

(E4) The elements of the eight-speed automatic transmission are arranged by placing input shaft IP1, first planetary gearset G1, second planetary gearset G2, third planetary gearset G3 from left to right. Fourth planet pinion P4 and fourth ring gear R4 are placed at the outer peripheral wall of fourth sun gear S4 of third planetary gearset G3. This arrangement leads to commonality of parts of input shaft IP1 through second planetary gearset G2, and a minimum increase of the overall longitudinal length. Therefore the number of gear speeds can be multiplied without degradation of the mountability.

Figure 8:
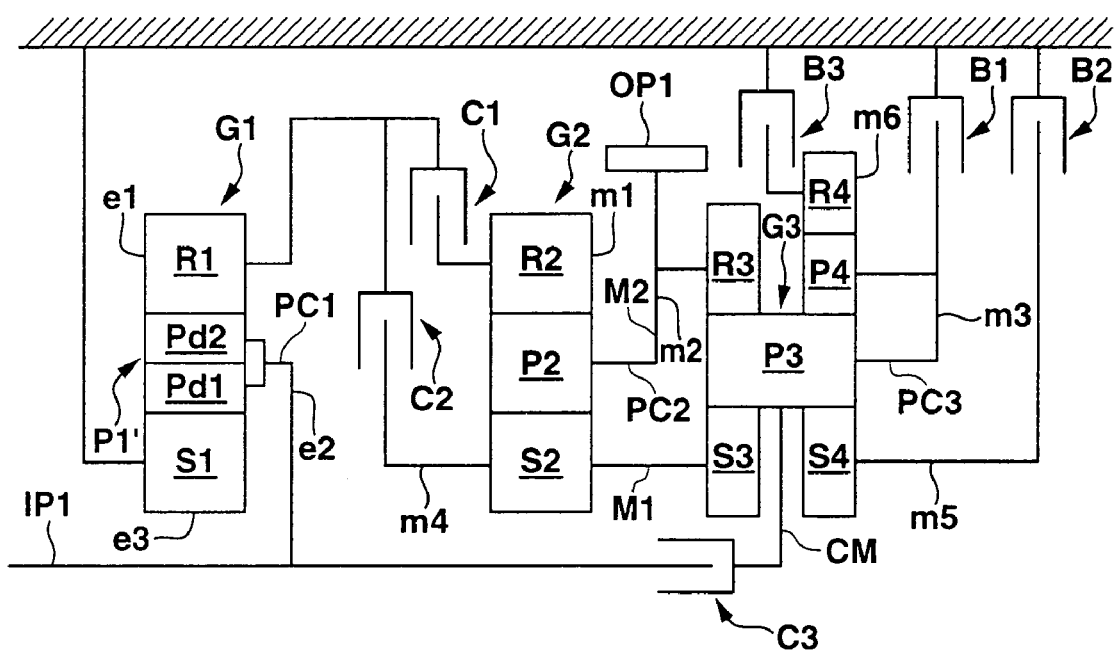
FIG. 8 is a schematic diagram depicting a multiple-speed automatic transmission for an automotive vehicle of a first variation of a second embodiment.

Referring now to FIG. 8, there is shown a multiple-speed automatic transmission for an automotive vehicle of a second embodiment of the present invention. The multiple-speed automatic transmission provides eight forward speeds and two reverse speeds. The multiple-speed automatic transmission includes first planetary gearset G1 at the left, second planetary gearset G2 in the center, and third planetary gearset G3 at the right. First planetary gearset G1 is of the double-pinion type, to serve for a speed-reducing planetary gearset as a speed-reducing unit. Second planetary gearset G2 is of the single-pinion type. Third planetary gearset G3 is of the double-sun-gear type. Second planetary gearset G2 and third planetary gearset G3 serve for a speed-shifting planetary gearset as a speed-shifting unit.

First planetary gearset G1, which is of the double-pinion type, consists of first sun gear S1, first ring gear R1, and first planet-pinion carrier PC1 that carries or rotatably supports a first planet pinion P1' including a planet pinion Pd1 meshed with first sun gear S1, and a planet pinion Pd2 meshed with both planet pinion Pd1 and first ring gear R1. First sun gear S1 as a third rotating element e3 is continuously held against rotation to a transmission housing. First ring gear R1 serves for a first rotating element e1 of first planetary gearset G1 with a first primary speed ratio slower than that of first planet-pinion carrier PC1 that serves for a second rotating element e2 of first planetary gearset G1.

Second planetary gearset G2, which is of the single-pinion type, consists of second sun gear S2, second ring gear R2, and second planet-pinion carrier PC2 that carries second planet pinion P2 meshed with both second sun gear S2 and second ring gear R2.

Third planetary gearset G3, which is of the double-sun-gear type, consists of two sun gears of third sun gear S3 and fourth sun gear S4, two ring gears of third ring gear R3 and fourth ring gear R4, and third planet-pinion carrier PC3. Third planet-pinion carrier PC3 carries two planet pinions of third planet pinion P3 and fourth planet pinion P4. Third planet pinion P3 is meshed with two sun gears of third sun gear S3 and fourth sun gear S4 and third ring gear R3. Fourth planet pinion P4 is meshed with third planet pinion P3 and fourth ring gear R4. Third planet-pinion carrier PC3 further includes center member CM between third sun gear S3 and fourth sun gear S4 for transmitting rotation power.

Second planetary gearset G2, third planetary gearset G3, and other rotating members around second planetary gearset G2 and third planetary gearset G3 are comprised as in the case of the first embodiment.

The aforementioned structure is connected to input shaft IP1 and output gear OP1. Input shaft IP1 is drivingly connected to first planet-pinion carrier PC1, to input driving torque transmitted via a torque converter (not shown) and others from an engine (not shown) as a drive source. Output gear OP1 is drivingly connected to second planet-pinion carrier PC2, to output driving torque via a final gear (not shown) and others to a driving wheel (not shown).

Additionally, the multiple-speed automatic transmission includes three clutches and three brakes. First clutch C1 selectively connects or disconnects first ring gear R1 and second ring gear R2. Second clutch C2 selectively connects or disconnects first ring gear R1 and second sun gear S2. Third clutch C3, and brakes B1, B2, and B3 are comprised as in the case of the first embodiment, as shown in FIG. 8.

Figure 9:
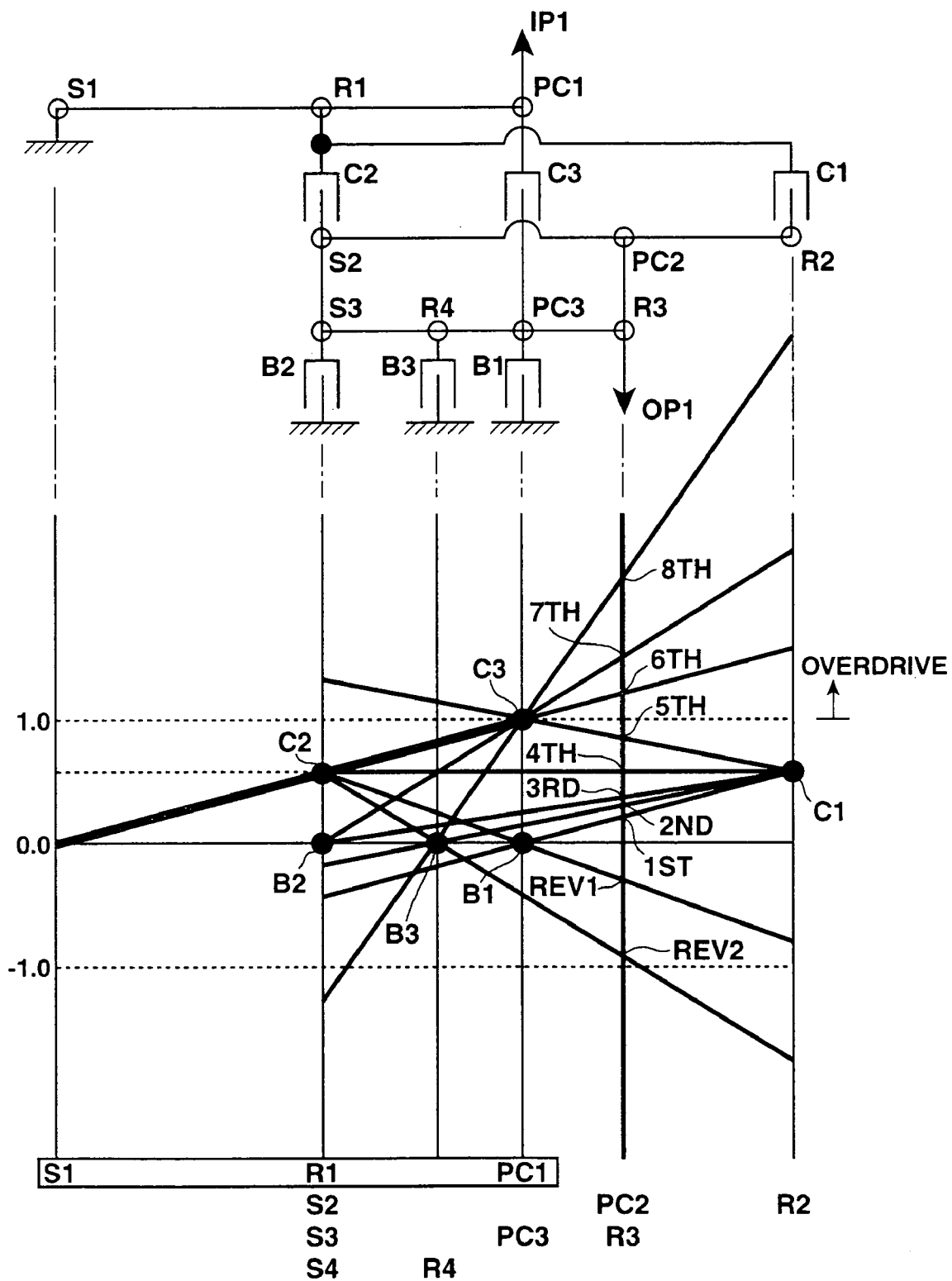
FIG. 9 is a collinear diagram of the multiple-speed automatic transmission of the first variation of the second embodiment.

Referring now to FIGS. 2, and 9 through 13B, the following describes the operation of the multiple-speed automatic transmission of the second embodiment. FIG. 2, partly shared between the first and second embodiments, shows clutch engagements and brake applications required to establish various gear speeds. FIG. 9 shows the collinear diagram of the multiple-speed automatic transmission. The collinear diagram shows the rotation states of the rotating members in each speed. FIGS. 10A to 13B show the power flow or the torque flow in each speed. In FIGS. 10A to 13B, the power flow through the clutches, the brakes, and the rotating members is indicated by bold lines, the power flow through the gears is indicated by a hatch pattern.

The first speed is established by engaging first clutch C1 and applying first brake B1, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with first brake B1 applied, third planet-pinion carrier PC3 is fixed to the transmission housing. With the rotation of third ring gear R3 or the output speed, third sun gear S3 rotates in the reverse direction at a reduced speed. Third sun gear S3 and second sun gear S2 of second planetary gearset G2 are solidly connected via first connecting member M1, so that the rotation speed of second sun gear 52 is the same as that of third sun gear S3. Accordingly, at second planetary gearset G2, second ring gear R2 rotates in the normal direction at a reduced speed and second sun gear 52 rotates in the reverse direction at a reduced speed. Therefore second planet-pinion carrier PC2 is forced to rotate at a speed further reduced from that of second ring gear R2, thereby outputs the rotation speed via second connecting member M2 to output gear OP1.

The collinear diagram of the multiple-speed automatic transmission as shown in FIG. 9 provides another analysis of the first speed. The point identified by C1 in the diagram, or the engagement point of first clutch C1 indicates the engagement of first clutch C1 with which the reduced speed is input to second ring gear R2 from first planetary gearset G1. The point identified by B1 in the diagram, or the application point of first brake B1 indicates the application of first brake B1 with which third planet-pinion carrier PC3 is held stationary. The operation of the speed-shifting planetary gearset is defined by the lever or straight line connecting the engagement point of first clutch C1 and the application point of first brake B1. The intersection point of the lever and the perpendicular line at output gear OP1 indicates the output speed. In the first speed, the rotation speed of input shaft IP1 is reduced to a point identified by 1ST in the diagram through the multiple-speed automatic transmission, and output to output gear OP1.

Figure 10A:
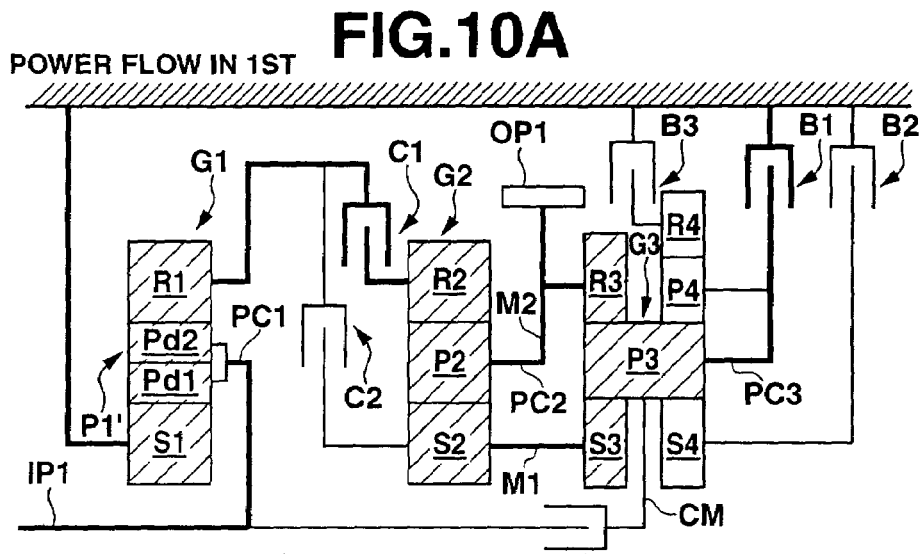
FIG. 10A is a schematic diagram depicting a power flow in the first speed of the multiple-speed automatic transmission of the first variation of the second embodiment.

The power flow or torque flow in the first speed is shown in FIG. 10A. The power flows through first clutch C1, first brake B1, and the rotating members, as shown by bold lines, first planetary gearset G1, second planetary gearset G2, and third planetary gearset G3 except fourth sun gear S4, fourth planet pinion P4, and fourth ring gear R4, as shown by a hatch pattern.

The second speed is established by releasing first brake B1 and applying third brake B3 to the operational state of the first speed, that is, by engaging first clutch C1 and applying third brake B3, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with third brake B3 applied, fourth ring gear R4 is fixed to the transmission housing. With the rotation of third ring gear R3 or the output speed, third sun gear S3 rotates in the reverse direction at a reduced speed (slower than that of the first speed). Third sun gear S3 and second sun gear S2 of second planetary gearset G2 are solidly connected via first connecting member M1, so that the rotation speed of second sun gear S2 is the same as that of third sun gear S3. Accordingly, at second planetary gearset G2, second ring gear R2 rotates in the normal direction at a reduced speed and second sun gear S2 rotates in the reverse direction at a reduced speed. On the other hand, at third planetary gearset G3, the rotation of third planet-pinion carrier PC3 is defined by the rotations of fourth ring gear R4 and third sun gear S3, and the rotation of third ring gear R3 is defined by the rotations of third sun gear S3 and third planet-pinion carrier PC3. Therefore second planet-pinion carrier PC2 and third ring gear R3 are forced to rotate at a speed further reduced from that of second ring gear R2, thereby output the rotation speed via second connecting member M2 to output gear OP1.

The collinear diagram of the multiple-speed automatic transmission as shown in FIG. 9 provides another analysis of the second speed. The point identified by C1 in the diagram, or the engagement point of first clutch C1 indicates the engagement of first clutch C1 with which the reduced speed is input to second ring gear R2 from first planetary gearset G1. The point identified by B3 in the diagram, or the application point of third brake B3 indicates the application of third brake B3 with which fourth ring gear R4 is held stationary. The operation of the speed-shifting planetary gearset is defined by the lever or straight line connecting the engagement point of first clutch C1 and the application point of third brake B3. The intersection point of the lever and the perpendicular line at output gear OP1 indicates the output speed. In the second speed, the rotation speed of input shaft IP1 is reduced to a point identified by 2ND in the diagram through the multiple-speed automatic transmission, and output to output gear OP1.

Figure 10B:
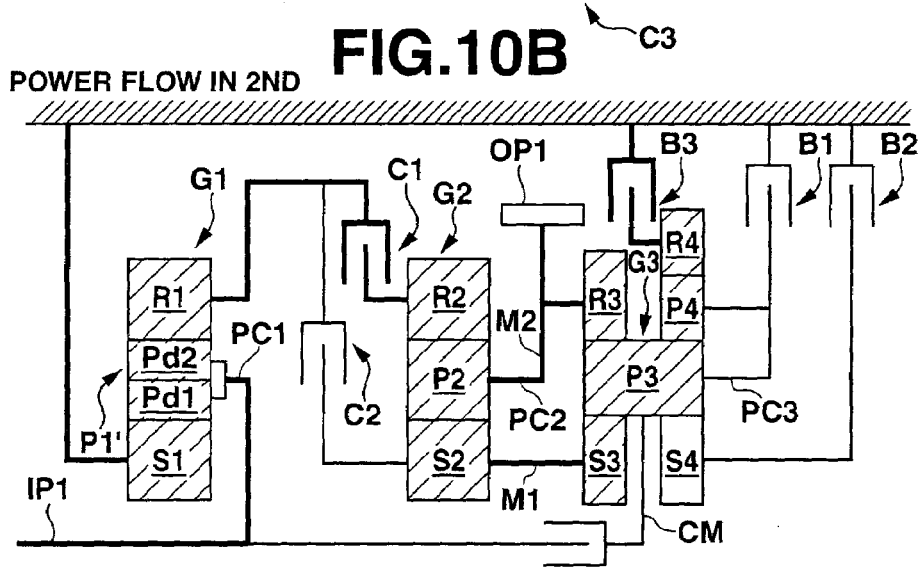
FIG. 10B is a schematic diagram depicting a power flow in the second speed of the multiple-speed automatic transmission of the first variation of the second embodiment.

The power flow or torque flow in the second speed is shown in FIG. 10B. The power flows through first clutch C1, third brake B3, and the rotating members, as shown by bold lines, first planetary gearset G1, second planetary gearset G2, and third planetary gearset G3 except fourth sun gear S4, as shown by a hatch pattern.

The third speed is established by releasing third brake B3 and applying second brake B2 to the operational state of the second speed, that is, by engaging first clutch C1 and applying second brake B2, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with second brake B2 applied, fourth sun gear S4 is fixed to the transmission housing. Third planet pinion P3, meshed with both third sun gear S3 and fourth sun gear S4, holds third sun gear S3 stationary according to the rotational state of fourth sun gear S4. Furthermore, second sun gear S2, solidly connected with third sun gear S3 via first connecting member M1, is held stationary to the transmission housing. Accordingly, at second planetary gearset G2, second ring gear R2 rotates at a reduced speed and second sun gear S2 is stationary. Therefore second planet-pinion carrier PC2 is forced to rotate at a speed further reduced from that of second ring gear R2, thereby outputs the rotation speed via second connecting member M2 to output gear OP1.

The collinear diagram of the multiple-speed automatic transmission as shown in FIG. 9 provides another analysis of the third speed. The point identified by C1 in the diagram, or the engagement point of first clutch C1 indicates the engagement of first clutch C1 with which the reduced speed is input to second ring gear R2 from first planetary gearset G1. The point identified by B2 in the diagram, or the application point of second brake B2 indicates the application of second brake B2 with which fourth sun gear S4 is held stationary. The operation of the speed-shifting planetary gearset is defined by the lever or straight line connecting the engagement point of first clutch C1 and the application point of second brake B2. The intersection point of the lever and the perpendicular line at output gear OP1 indicates the output speed. In the third speed, the rotation speed of input shaft IP1 is reduced to a point identified by 3RD in the diagram (faster than the second speed) through the multiple-speed automatic transmission, and output to output gear OP1.

Figure 10C:
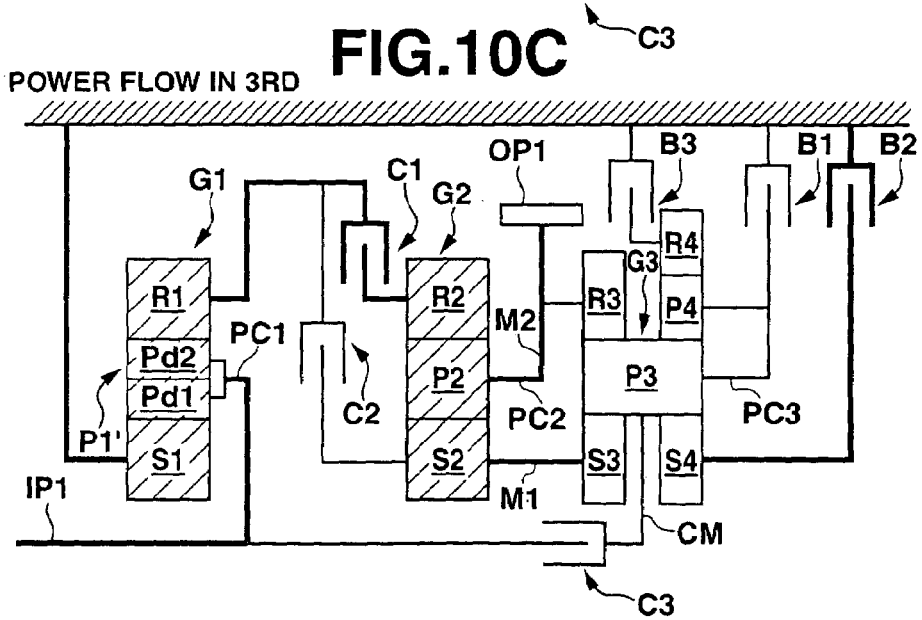
FIG. 10C is a schematic diagram depicting a power flow in the third speed of the multiple-speed automatic transmission of the first variation of the second embodiment.

The power flow or torque flow in the second speed is shown in FIG. 10C. The power flows through first clutch C1, second brake B2, and the rotating members, as shown by bold lines, first planetary gearset G1 and second planetary gearset G2, as shown by a hatch pattern.

The fourth speed is established by releasing second brake B2 and engaging second clutch C2 to the operational state of the third speed, that is, by engaging first clutch C1 and second clutch C2, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. At the same time, with second clutch C2 engaged, the reduced speed is input to second sun gear S2 from first ring gear R1 of first planetary gearset G1. Accordingly, at second planetary gearset G2, second ring gear R2 and second sun gear S2 rotate at the same reduced speed, so that second planet-pinion carrier PC2 rotates solidly with second ring gear R2 and second sun gear S2. Therefore second planet-pinion carrier PC2 is forced to rotate at the reduced speed that is reduced at first planetary gearset G1, thereby outputs the rotation speed via second connecting member M2 to output gear OP1.

The collinear diagram of the multiple-speed automatic transmission as shown in FIG. 9 provides another analysis of the fourth speed. The point identified by C1 in the diagram, or the engagement point of first clutch C1 indicates the engagement of first clutch C1 with which the reduced speed is input to second ring gear R2 from first planetary gearset G1. Similarly, the point identified by C2 in the diagram, or the engagement point of second clutch C2 indicates the engagement of second clutch C2 with which the reduced speed is input to second sun gear S2 from first planetary gearset G1. The operation of the speed-shifting planetary gearset is defined by the lever or straight line connecting the engagement point of first clutch C1 and the engagement point of second clutch C2. The intersection point of the lever and the perpendicular line at output gear OP1 indicates the output speed. In the fourth speed, the rotation speed of input shaft IP1 is reduced to a point identified by 4TH in the diagram (to the gear ratio of first planetary gearset G1) through the multiple-speed automatic transmission, and output to output gear OP1.

Figure 11A:
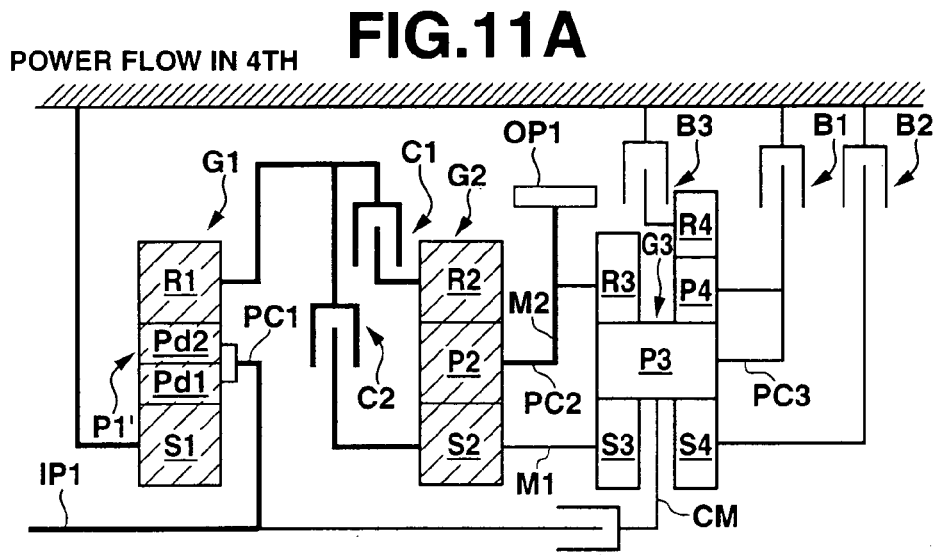
FIG. 11A is a schematic diagram depicting a power flow in the fourth speed of the multiple-speed automatic transmission of the first variation of the second embodiment.

The power flow or torque flow in the second speed is shown in FIG. 11A. The power flows through first clutch C1, second clutch C2, and the rotating members, as shown by bold lines, first planetary gearset G1 and second planetary gearset G2, as shown by a hatch pattern.

The fifth speed is established by disengaging second clutch C2 and engaging third clutch C3 to the operational state of the fourth speed, that is, by engaging first clutch C1 and third clutch C3, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with third clutch C3 engaged, the input rotation of input shaft IP1 is input to third planet-pinion carrier PC3 via center member CM. Accordingly, with the rotation of third ring gear R3 or the output speed, third sun gear S3 rotates at a speed increased faster than that of third ring gear R3. Third sun gear S3 and second sun gear S2 of second planetary gearset G2 are solidly connected via first connecting member M1, so that the rotation speed of second sun gear S2 is the same as that of third sun gear S3. Accordingly, at second planetary gearset G2, second ring gear R2 rotates at a reduced speed and second sun gear S2 rotates at the faster speed. Therefore second planet-pinion carrier PC2 is forced to rotate at a speed increased from the speed reduced at first planetary gearset G1 (but slower than the input speed), thereby outputs the rotation speed via second connecting member M2 to output gear OP1.

The collinear diagram of the multiple-speed automatic transmission as shown in FIG. 9 provides another analysis of the fifth speed. The point identified by C1 in the diagram, or the engagement point of first clutch C1 indicates the engagement of first clutch C1 with which the reduced speed is input to second ring gear R2 from first planetary gearset G1. Similarly, the point identified by C3 in the diagram, or the engagement point of third clutch C3 indicates the engagement of third clutch C3 with which the input speed is input to third planet-pinion carrier PC3 from input shaft IP1. The operation of the speed-shifting planetary gearset is defined by the lever or straight line connecting the engagement point of first clutch C1 and the engagement point of third clutch C3. The intersection point of the lever and the perpendicular line at output gear OP1 indicates the output speed. In the fifth speed, the rotation speed of input shaft IP1 is reduced slightly to a point identified by 5TH in the diagram through the multiple-speed automatic transmission, and output to output gear OP1.

Figure 11B:
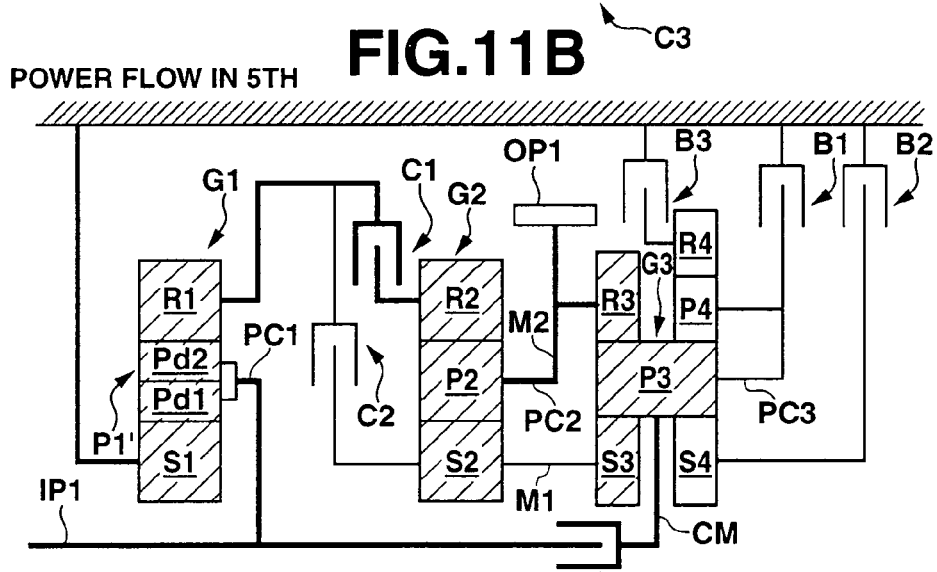
FIG. 11B is a schematic diagram depicting a power flow in the fifth speed of the multiple-speed automatic transmission of the first variation of the second embodiment.
Figure 11C:
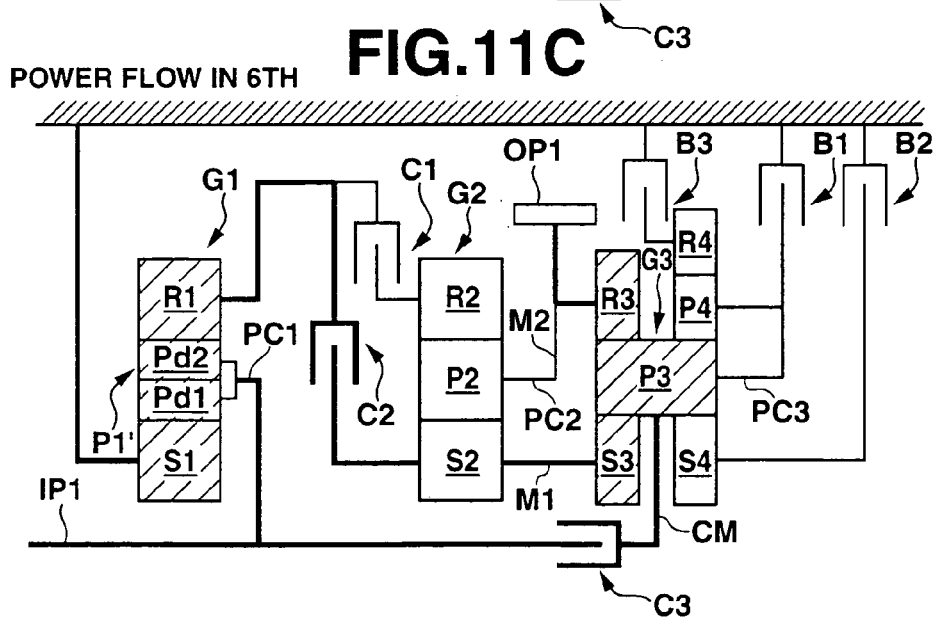
FIG. 11C is a schematic diagram depicting a power flow in the sixth speed of the multiple-speed automatic transmission of the first variation of the second embodiment.

The power flow or torque flow in the fifth speed is shown in FIG. 11B. The power flows through first clutch C1, third clutch C3, and the rotating members, as shown by bold lines, first planetary gearset G1, second planetary gearset G2, and third planetary gearset G3 except fourth sun gear S4, fourth planet pinion P4, and fourth ring gear R4, as shown by a hatch pattern.

The sixth speed is established by disengaging first clutch C1 and engaging second clutch C2 to the operational state of the fifth speed, that is, by engaging second clutch C2 and third clutch C3, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1 via second sun gear S2 and first connecting member M1. At the same time, with third clutch C3 engaged, the input rotation of input shaft IP1 is input to third planet-pinion carrier PC3 via center member CM. Accordingly, at third planetary gearset G3, third planet-pinion carrier PC3 rotates at the input speed and third sun gear S3 rotates at the speed reduced at first planetary gearset G1. Therefore third ring gear R3 is forced to rotate at a speed increased faster than the input speed, thereby outputs the increased rotation speed via second connecting member M2 to output gear OP1.

The collinear diagram of the multiple-speed automatic transmission as shown in FIG. 9 provides another analysis of the sixth speed. The point identified by C2 in the diagram, or the engagement point of second clutch C2 indicates the engagement of second clutch C2 with which the reduced speed is input to third sun gear S3 from first planetary gearset G1. Similarly, the point identified by C3 in the diagram, or the engagement point of third clutch C3 indicates the engagement of third clutch C3 with which the input speed is input to third planet-pinion carrier PC3 from input shaft IP1. The operation of the speed-shifting planetary gearset is defined by the lever or straight line connecting the engagement point of second clutch C2 and the engagement point of third clutch C3. The intersection point of the lever and the perpendicular line at output gear OP1 indicates the output speed. In the sixth speed, the rotation speed of input shaft IP1 is increased slightly to a point identified by 6TH in the diagram through the multiple-speed automatic transmission, and output to output gear OP1.

The power flow or torque flow in the sixth speed is shown in FIG. 1C. The power flows through second clutch C2, third clutch C3, and the rotating members, as shown by bold lines, first planetary gearset G1 and third planetary gearset G3 except fourth sun gear S4, fourth planet pinion P4, and fourth ring gear R4, as shown by a hatch pattern.

The seventh speed is established by disengaging second clutch C2 and applying second brake B2 to the operational state of the sixth speed, that is, by engaging third clutch C3 and applying second brake B2, as shown in FIG. 2. With third clutch C3 engaged, the input rotation speed of input shaft IP1 is input to third planet-pinion carrier PC3 of third planetary gearset G3 via center member CM. On the other hand, with second brake B2 applied, fourth sun gear S4 of third planetary gearset G3 is held stationary to the transmission housing. Accordingly, at third planetary gearset G3, third planet-pinion carrier PC3 rotates at the input speed and fourth sun gear S4 is stationary to the transmission housing. Therefore third ring gear R3 is forced to rotate at a speed increased faster than the input speed, thereby outputs the rotation speed via second connecting member M2 to output gear OP1.

The collinear diagram of the multiple-speed automatic transmission as shown in FIG. 9 provides another analysis of the seventh speed. The point identified by C3 in the diagram, or the engagement point of third clutch C3 indicates the engagement of third clutch C3 with which the input speed is input to third planet-pinion carrier PC3 from input shaft IP1. The point identified by B2 in the diagram, or the application point of second brake B2 indicates the application of second brake B2 with which fourth sun gear S4 is held stationary. The operation of the speed-shifting planetary gearset is defined by the lever or straight line connecting the engagement point of third clutch C3 and the application point of second brake B2. The intersection point of the lever and the perpendicular line at output gear OP1 indicates the output speed. In the seventh speed, the rotation speed of input shaft IP1 is increased to a point identified by 7TH in the diagram through the multiple-speed automatic transmission, and output to output gear OP1.

Figure 12A:
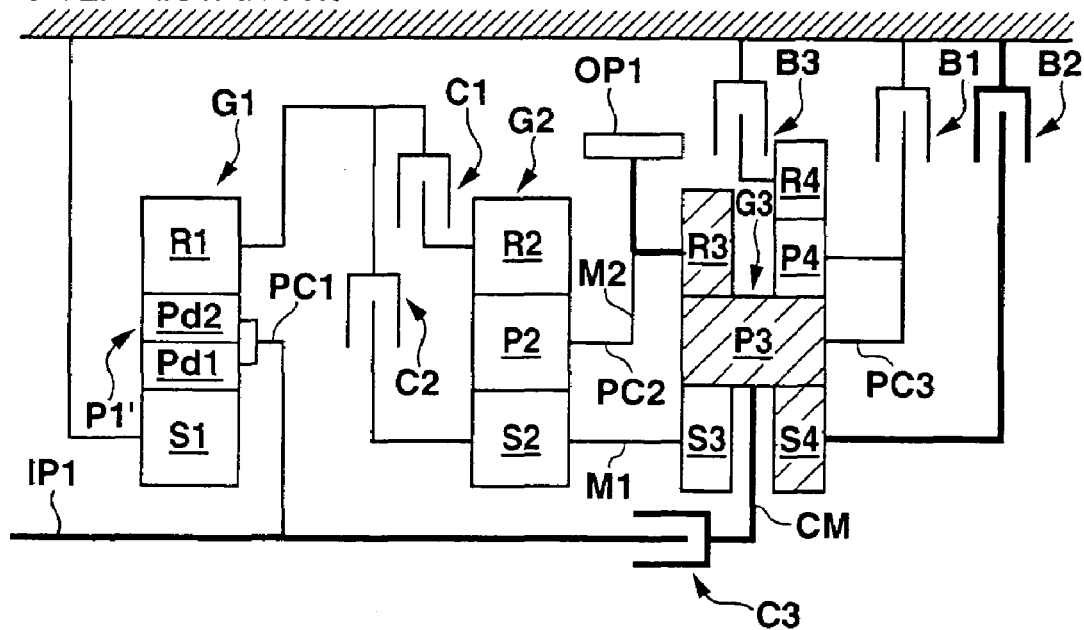
FIG. 12A is a schematic diagram depicting a power flow in the seventh speed of the multiple-speed automatic transmission of the first variation of the second embodiment.

The power flow or torque flow in the seventh speed is shown in FIG. 12A. The power flows through third clutch C3, second brake B2, and the rotating members, as shown by bold lines, third planetary gearset G3 except third sun gear S3, fourth planet pinion P4, and fourth ring gear R4, as shown by a hatch pattern.

The eighth speed is established by releasing second brake B2 and applying third brake B3 to the operational state of the seventh speed, that is, by engaging third clutch C3 and applying third brake B3, as shown in FIG. 2. With third clutch C3 engaged, the input rotation speed of input shaft IP1 is input to third planet-pinion carrier PC3 of third planetary gearset G3 via center member CM. On the other hand, with third brake B3 applied, fourth ring gear R4 of third planetary gearset G3 is held stationary to the transmission housing. Accordingly, at third planetary gearset G3, third planet-pinion carrier PC3 rotates at the input speed and fourth ring gear R4 is stationary to the transmission housing. This defines the rotation of fourth sun gear S4, and thereby defines the rotation of third sun gear S3 that rotates solidly with fourth sun gear S4. Therefore third ring gear R3 is forced to rotate at a speed defined and increased faster than the input speed by the rotations of third sun gear S3 and third planet-pinion carrier PC3, thereby outputs the rotation speed via second connecting member M2 to output gear OP1.

The collinear diagram of the multiple-speed automatic transmission as shown in FIG. 9 provides another analysis of the eighth speed. The point identified by C3 in the diagram, or the engagement point of third clutch C3 indicates the engagement of third clutch C3 with which the input speed is input to third planet-pinion carrier PC3 from input shaft IP1. The point identified by B3 in the diagram, or the application point of third brake B3 indicates the application of third brake B3 with which fourth ring gear R4 is held stationary to the transmission housing. The operation of the speed-shifting planetary gearset is defined by the lever or straight line connecting the engagement point of third clutch C3 and the application point of third brake B3. The intersection point of the lever and the perpendicular line at output gear OP1 indicates the output speed. In the eighth speed, the rotation speed of input shaft IP1 is increased to a point identified by 8TH in the diagram through the multiple-speed automatic transmission, and output to output gear OP1.

Figure 12B:
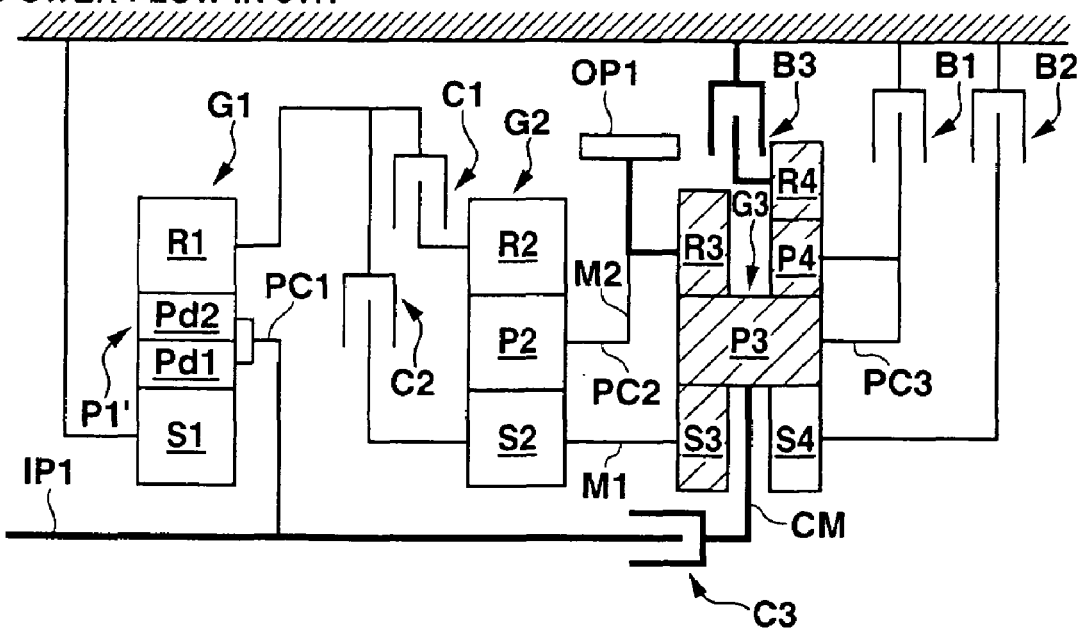
FIG. 12B is a schematic diagram depicting a power flow in the eighth speed of the multiple-speed automatic transmission of the first variation of the second embodiment.

The power flow or torque flow in the eighth speed is shown in FIG. 12B. The power flows through third clutch C3, third brake B3, and the rotating members, as shown by bold lines, third planetary gearset G3 except fourth sun gear S4, as shown by a hatch pattern.

The first reverse speed is established by engaging second clutch C2 and applying first brake B1, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1 via second sun gear S2 and first connecting member M1. On the other hand, with first brake B1 applied, third planet-pinion carrier PC3 is fixed to the transmission housing. Accordingly, at third planetary gearset G3, third sun gear S3 rotates in the normal direction at the reduced speed and third planet-pinion carrier PC3 is held stationary to the transmission housing. Therefore third ring gear R3 is forced to rotate in the reverse direction at a reduced speed, thereby outputs the rotation speed via second connecting member M2 to output gear OP1.

The collinear diagram of the multiple-speed automatic transmission as shown in FIG. 9 provides another analysis of the first reverse speed. The point identified by C2 in the diagram, or the engagement point of second clutch C2 indicates the engagement of second clutch C2 with which the reduced speed is input to third sun gear S3 from first planetary gearset G1. The point identified by B1 in the diagram, or the application point of first brake B1 indicates the application of first brake B1 with which third planet-pinion carrier PC3 is held stationary. The operation of the speed-shifting planetary gearset is defined by the lever or straight line connecting the engagement point of second clutch C2 and the application point of first brake B1. The intersection point of the lever and the perpendicular line at output gear OP1 indicates the output speed. In the first reverse speed, the rotation speed of input shaft IP1 is reduced to a point identified by REV1 in the diagram through the multiple-speed automatic transmission, and output to output gear OP1.

Figure 13A:
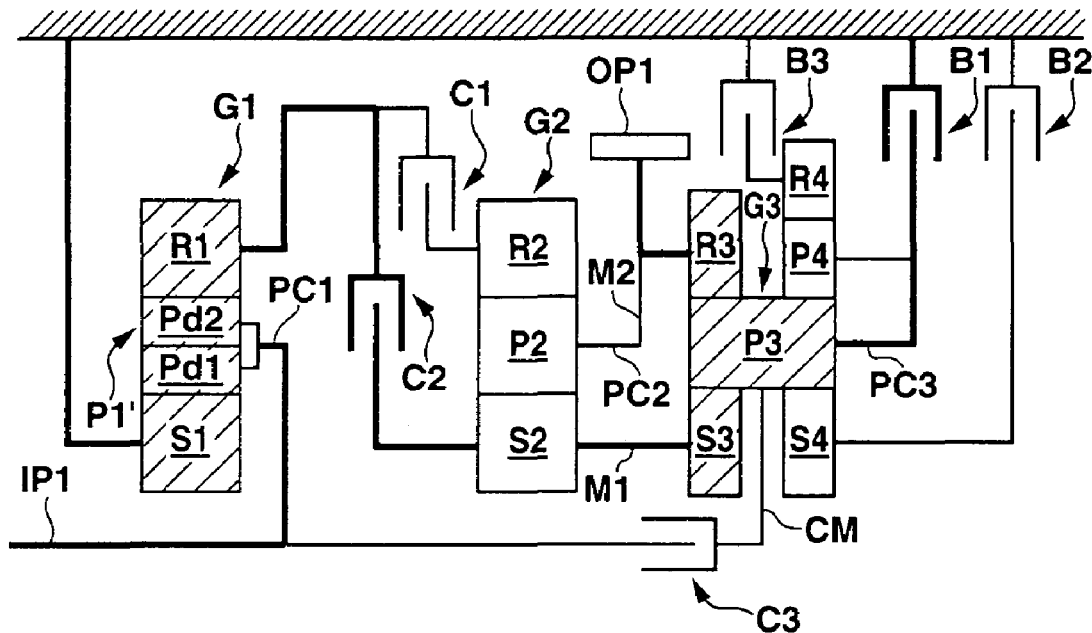
FIG. 13A is a schematic diagram depicting a power flow in the first reverse speed of the multiple-speed automatic transmission of the first variation of the second embodiment.

The power flow or torque flow in the first reverse speed is shown in FIG. 13A. The power flows through second clutch C2, first brake B1, and the rotating members, as shown by bold lines, first planetary gearset G1 and third planetary gearset G3 except fourth sun gear S4, fourth planet pinion P4, and fourth ring gear R4, as shown by a hatch pattern.

The second reverse speed is established by releasing first brake B1 and applying third brake B3 to the operational state of the first reverse speed, that is, by engaging second clutch C2 and applying third brake B3, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1 via second sun gear S2 and first connecting member M1. On the other hand, with third brake B3 applied, fourth ring gear R4 is fixed to the transmission housing. Accordingly, at third planetary gearset G3, third sun gear S3 rotates in the normal direction at the reduced speed and fourth ring gear R4 is held stationary to the transmission housing. This defines the rotation of third planet-pinion carrier PC3. Therefore third ring gear R3 is forced to rotate in the reverse direction at a reduced speed (faster than that of the first reverse speed) defined by the rotations of third sun gear S3 and third planet-pinion carrier PC3, thereby outputs the rotation speed via second connecting member M2 to output gear OP1.

The collinear diagram of the multiple-speed automatic transmission as shown in FIG. 9 provides another analysis of the second reverse speed. The point identified by C2 in the diagram, or the engagement point of second clutch C2 indicates the engagement of second clutch C2 with which the reduced speed is input to third sun gear S3 from first planetary gearset G1. The point identified by B3 in the diagram, or the application point of third brake B3 indicates the application of third brake B3 with which fourth ring gear R4 is held stationary. The operation of the speed-shifting planetary gearset is defined by the lever or straight line connecting the engagement point of second clutch C2 and the application point of third brake B3. The intersection point of the lever and the perpendicular line at output gear OP1 indicates the output speed. In the second reverse speed, the rotation speed of input shaft IP1 is reduced to a point identified by REV2 in the diagram through the multiple-speed automatic transmission, and output to output gear OP1.

Figure 13B:
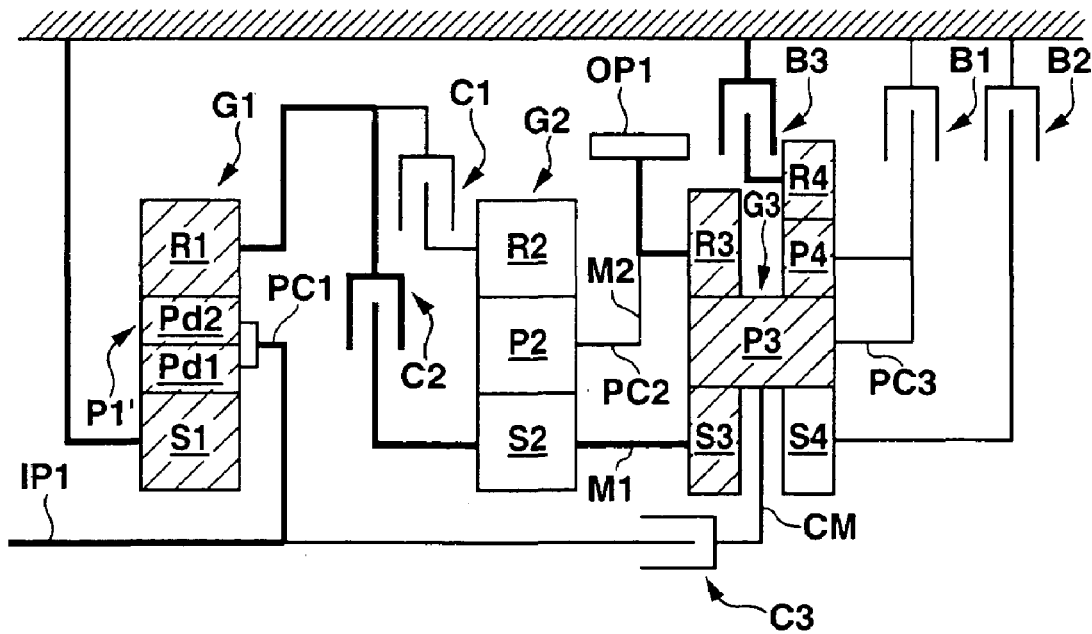
FIG. 13B is a schematic diagram depicting a power flow in the second reverse speed of the multiple-speed automatic transmission of the first variation of the second embodiment.

The power flow or torque flow in the second reverse speed is shown in FIG. 13B. The power flows through second clutch C2, third brake B3, and the rotating members, as shown by bold lines, first planetary gearset G1 and third planetary gearset G3 except fourth sun gear S4, as shown by a hatch pattern.

Figure 14:
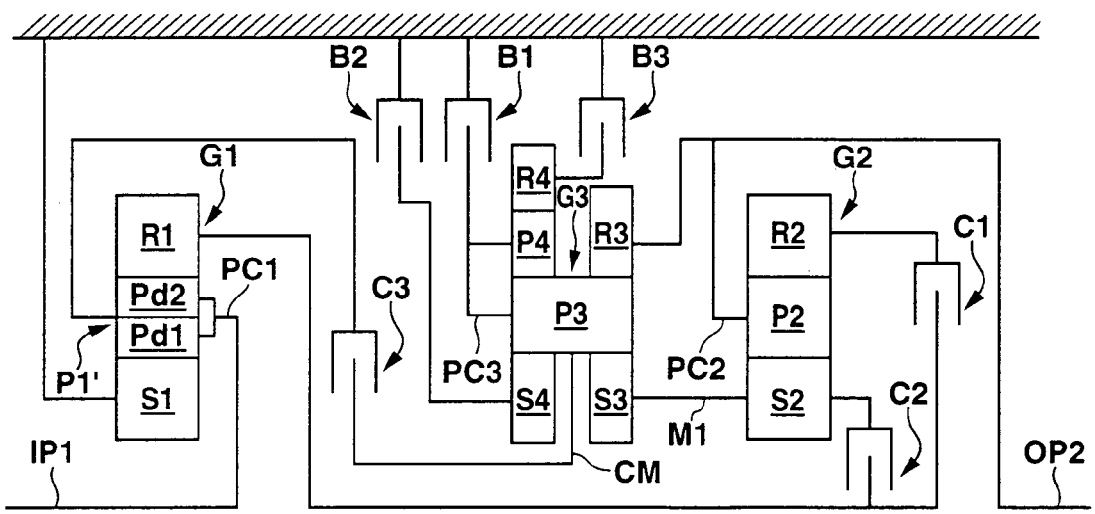
FIG. 14 is a schematic diagram depicting a multiple-speed automatic transmission for an automotive vehicle of a second variation of the second embodiment.
Figure 15A:
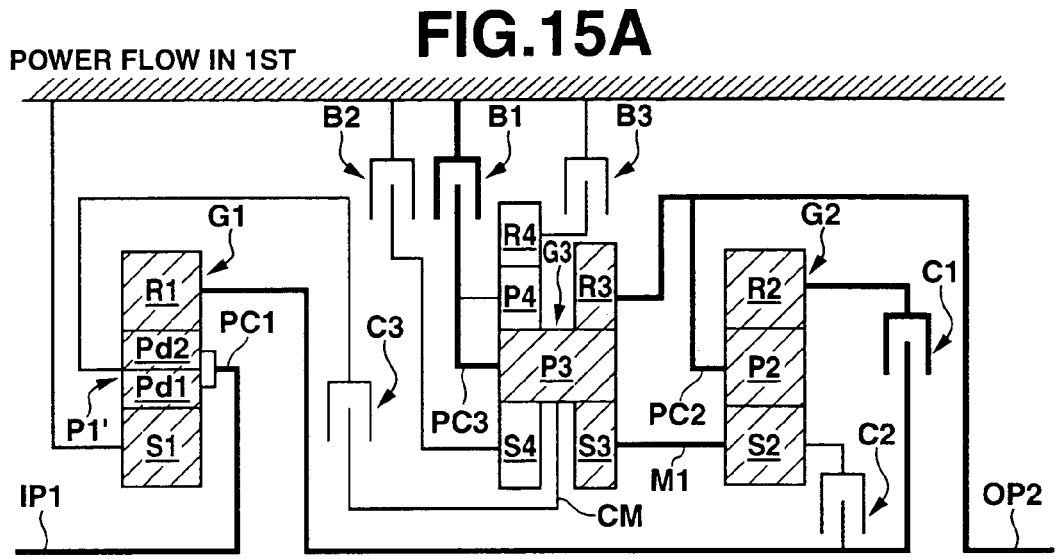
FIG. 15A is a schematic diagram depicting a power flow in the first speed of the multiple-speed automatic transmission of the second variation of the second embodiment.
Figure 15B:
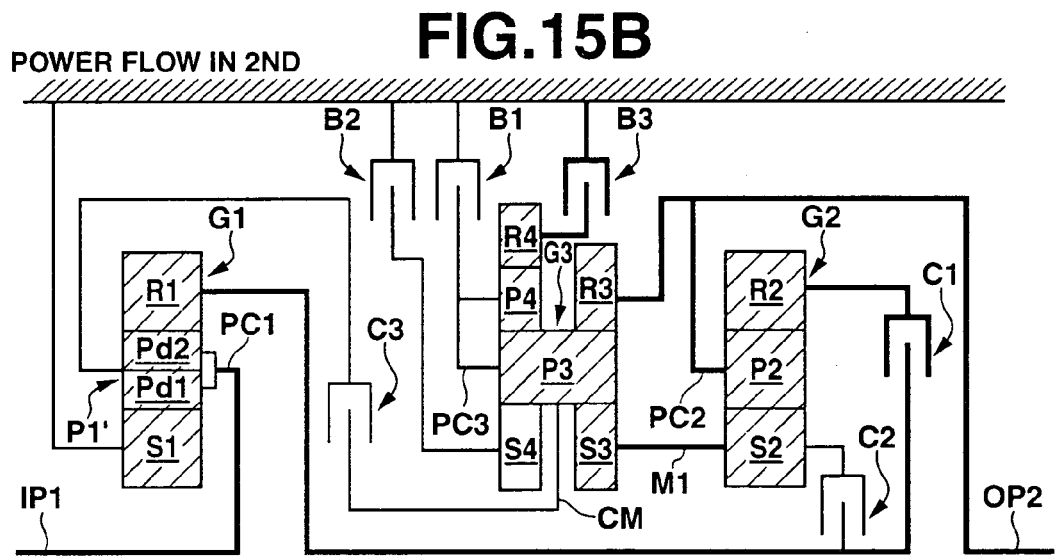
FIG. 15B is a schematic diagram depicting a power flow in the second speed of the multiple-speed automatic transmission of the second variation of the second embodiment.
Figure 15C:
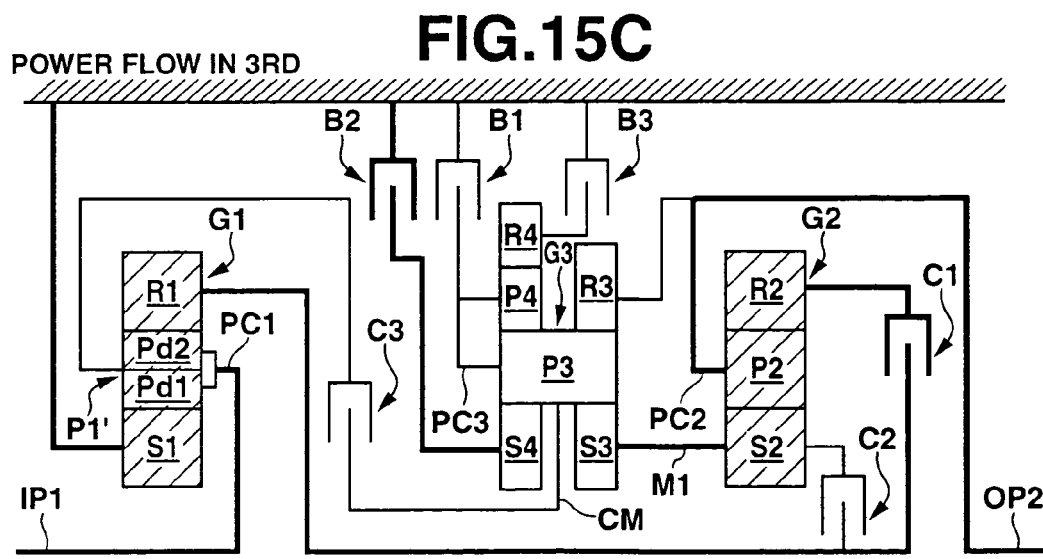
FIG. 15C is a schematic diagram depicting a power flow in the third speed of the multiple-speed automatic transmission of the second variation of the second embodiment.
Figure 16A:
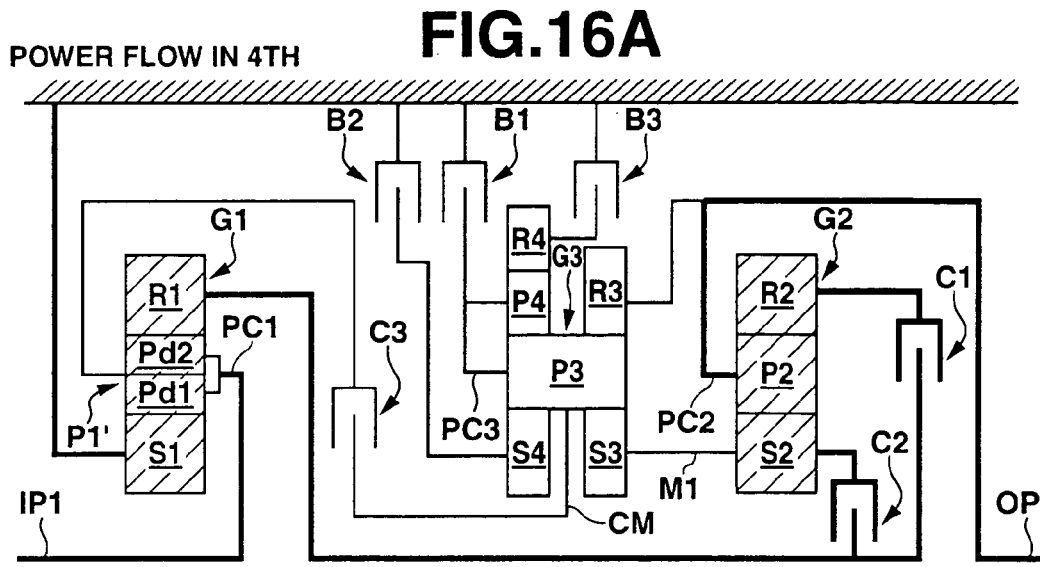
FIG. 16A is a schematic diagram depicting a power flow in the fourth speed of the multiple-speed automatic transmission of the second variation of the second embodiment.
Figure 16B:
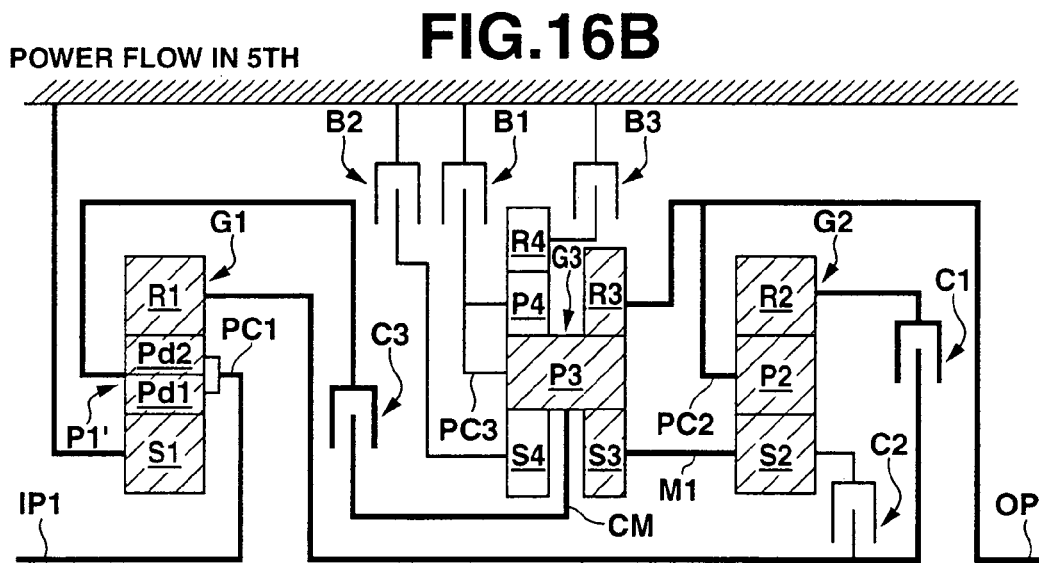
FIG. 16B is a schematic diagram depicting a power flow in the fifth speed of the multiple-speed automatic transmission of the second variation of the second embodiment.
Figure 16C:
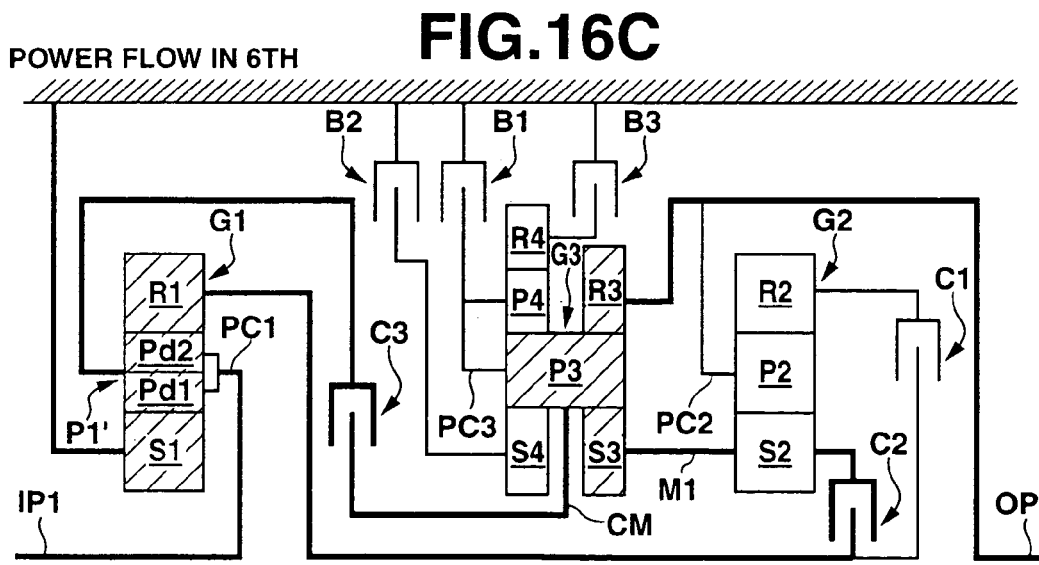
FIG. 16C is a schematic diagram depicting a power flow in the sixth speed of the multiple-speed automatic transmission of the second variation of the second embodiment.
Figure 18A:
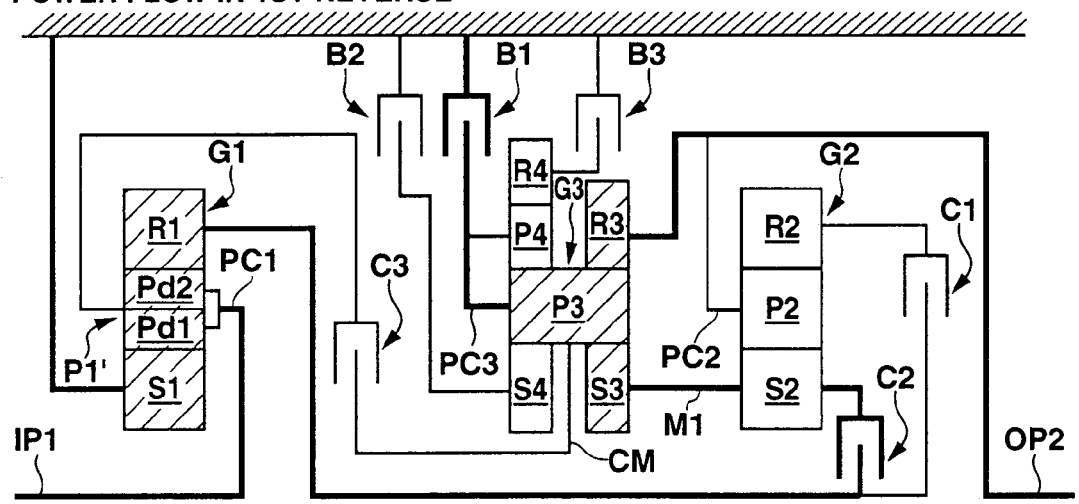
FIG. 18A is a schematic diagram depicting a power flow in the first reverse speed of the multiple-speed automatic transmission of the second variation of the second embodiment.
Figure 18B:
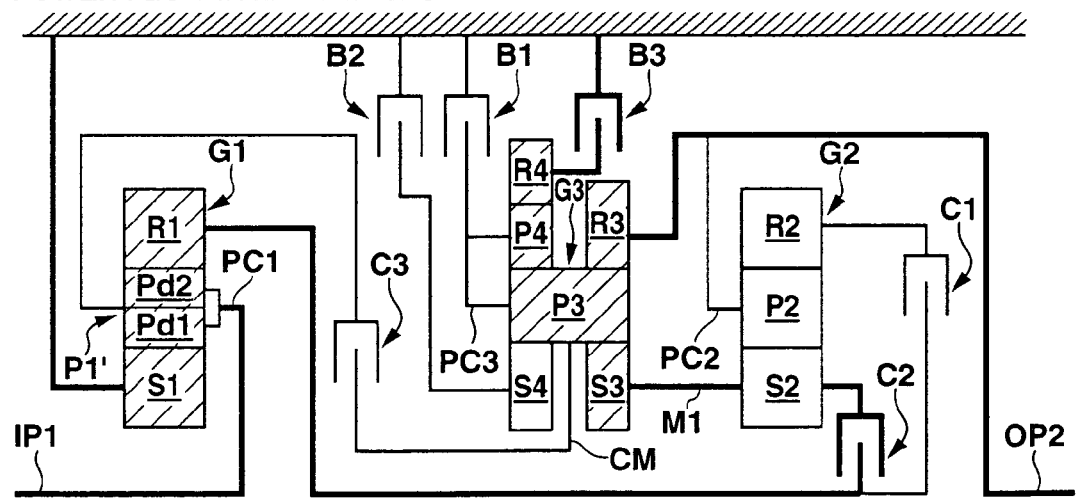
FIG. 18B is a schematic diagram depicting a power flow in the second reverse speed of the multiple-speed automatic transmission of the second variation of the second embodiment.

Referring now to FIG. 14, there is shown a multiple-speed automatic transmission for an automotive vehicle of a second variation of the second embodiment of the present invention. The multiple-speed automatic transmission provides eight forward speeds and two reverse speeds. The multiple-speed automatic transmission includes first planetary gearset G1 at the left, third planetary gearset G3 in the center, and second planetary gearset G2 at the right. First planetary gearset G1 is of the double-pinion type, to serve for a speed-reducing planetary gearset as a speed-reducing unit. Second planetary gearset G2 is of the single-pinion type. Third planetary gearset G3 is of the double-sun-gear type. Second planetary gearset G2 and third planetary gearset G3 serve for a speed-shifting planetary gearset as a speed-shifting unit.

The difference between this second variation and the first variation is in the places of second planetary gearset G2 and third planetary gearset G3, so that an output shaft OP2 as an output section is provided along the same axis of input shaft IP1 in the second variation. Third planetary gearset G3 is connected to brakes B1, B2, and B3. With second planetary gearset G2 placed in the center, and third planetary gearset G3 placed at the right, the brakes and the rotating members close the transmission housing to the right. In the second variation of the second embodiment, with second planetary gearset G2 and third planetary gearset G3 replaced with each other, third clutch C3, first brake B1, and second brake B2 are placed between first planetary gearset G1 and third planetary gearset G3. Third brake B3 is placed between third planetary gearset G3 and second planetary gearset G2. First clutch C1 and second clutch C2 are placed on the right of second planetary gearset G2. Thus, output shaft OP2 is provided along the same axis of input shaft IP1. This arrangement is allowed by applying a double-pinion type to first planetary gearset G1 or replacing first planet-pinion carrier PC1 and first ring gear R1 with each other in the collinear diagram, and placing second planetary gearset G2 at the right.

Other elements of the second variation of the second embodiment except the aforementioned difference are comprised as in the case of the first variation of the second embodiment. FIGS. 15A through 18B show the power flow or the torque flow in each speed. In FIGS. 15A to 18B, the power flow through the clutches, the brakes, and the rotating members is indicated by bold lines, and the power flow through the gears is indicated by a hatch pattern.

The multiple-speed automatic transmission of the second embodiment is constructed and operated as discussed above. The following describes effects of the second embodiment. The multiple-speed automatic transmission of the second embodiment provides the same effects (E1), (E2), and (E3) as the first embodiment, and additionally the following effect. (E5) Applying the double-pinion type to first planetary gearset G1 as a speed-reducing planetary gearset allows wide flexibility for the arrangement of the automatic transmission. Output gear OP1 may be applied as an output unit, as shown in the first variation of the second embodiment, while output shaft OP2 may be applied as an output unit along the same axis of input shaft IP1, as shown in the second variation of the second embodiment. Consequently, a suitable automatic transmission can be selectively provided for a front-engine, front-drive vehicle, or a front-engine, rear-drive vehicle.

Figure 19:
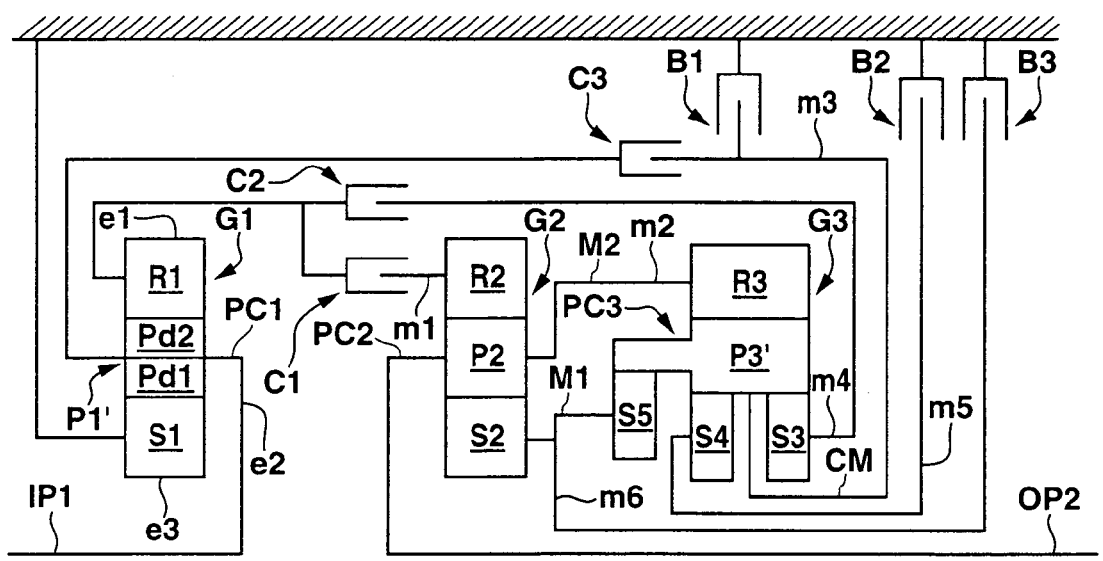
FIG. 19 is a schematic diagram depicting a multiple-speed automatic transmission for an automotive vehicle of a third embodiment.

Referring now to FIG. 19, there is shown a multiple-speed automatic transmission for an automotive vehicle of a third embodiment of the present invention. The multiple-speed automatic transmission provides eight forward speeds and two reverse speeds. The multiple-speed automatic transmission includes first planetary gearset G1 at the left, second planetary gearset G2 in the center, and third planetary gearset G3 at the right. First planetary gearset G1 is of the double-pinion type, to serve for a speed-reducing planetary gearset as a speed-reducing unit. Second planetary gearset G2 is of the single-pinion type. Third planetary gearset G3 is of the triple-sun-gear type. Second planetary gearset G2 and third planetary gearset G3 serve for a speed-shifting planetary gearset as a speed-shifting unit.

First planetary gearset G1, which is of the double-pinion type, consists of first sun gear S1, first ring gear R1, and first planet-pinion carrier PC1 that carries a first planet pinion P1' including a planet pinion Pd1 meshed with first sun gear S1, and a planet pinion Pd2 meshed with both planet pinion Pd1 and first ring gear R1. First sun gear S1 as a third rotating element e3 is continuously held against rotation to the transmission housing. First ring gear R1 serves for a first rotating element e1 of first planetary gearset G1 with a first primary speed ratio slower than that of first planet-pinion carrier PC1 that serves for a second rotating element e2 of first planetary gearset G1.

Second planetary gearset G2, which is of the single-pinion type, consists of second sun gear S2, second ring gear R2, and second planet-pinion carrier PC2 that carries second planet pinion P2 meshed with both second sun gear S2 and second ring gear R2.

Third planetary gearset G3, which is of the triple-sun-gear type, consists of three sun gears of third sun gear S3, fourth sun gear S4, and fifth sun gear S5, third ring gear R3, and third planet-pinion carrier PC3 that rotatably supports a third planet pinion P3'. Third planet pinion P3', which is formed of a two-stepped cylindrical shape, that is, has integrally two different gears or gear ratios, is meshed with third sun gear S3, fourth sun gear S4, and third ring gear R3 at the portion of a larger diameter, and fifth sun gear S5 at the portion of a smaller diameter. Third planet-pinion carrier PC3 further includes a center member CM between third sun gear S3 and fourth sun gear 54 for transmitting rotation power. With fourth sun gear S4 held stationary and center member CM rotated, fifth sun gear S5 rotates at a speed reduced slower than that of center member CM in the same direction of center member CM. With center member CM held stationary and both third sun gear S3 and fourth sun gear S4 rotated, fifth sun gear S5 rotates at a speed reduced slower than that of third sun gear S3 and fourth sun gear S4 in the same direction of third sun gear S3 and fourth sun gear S4.

In addition, first connecting member M1 is provided between second planetary gearset G2 and third planetary gearset G3, for connecting second sun gear S2 and fifth sun gear S5 solidly to each other. Second connecting member M2 is provided between second planetary gearset G2 and third planetary gearset G3, for connecting second planet-pinion carrier PC2 and third ring gear R3 solidly to each other.

The speed-shifting planetary gearset, which consists of second planetary gearset G2 and third planetary gearset G3, includes six rotating members. A first rotating member m1 consists of elements that rotate solidly with second ring gear R2. A second rotating member m2 consists of elements that rotate solidly with second connecting member M2. A third rotating member m3 consists of elements that rotate solidly with center member CM. A fourth rotating member m4 consists of elements that rotate solidly with third sun gear S3. A fifth rotating member m5 consists of elements that rotate solidly with fourth sun gear S4. A sixth rotating member m6 consists of elements that rotate solidly with first connecting member M1.

The aforementioned structure is connected to input shaft IP1 and output shaft OP2. Input shaft IP1 is drivingly connected to first planet-pinion carrier PC1, to input driving torque transmitted via a torque converter (not shown) and others from an engine (not shown) as a drive source. Output shaft OP2 is drivingly connected to second planet-pinion carrier PC2, to output driving torque via a final gear (not shown) and others to a driving wheel (not shown).

Additionally, the multiple-speed automatic transmission includes three clutches and three brakes. First clutch C1 selectively connects or disconnects first ring gear R1 and second ring gear R2. Second clutch C2 selectively connects or disconnects first ring gear R1 and third sun gear S3. Third clutch C3 selectively connects or disconnects first planet-pinion carrier PC1 and center member CM of third planet-pinion carrier PC3. First brake B1 is operable to selectively hold against rotation to the transmission housing or release center member CM of third planet-pinion carrier PC3 (third rotating member m3). Second brake B2 is operable to selectively hold against rotation to the transmission housing or release fourth sun gear S4 (fifth rotating member m5). Third brake B3 is operable to selectively hold against rotation to the transmission housing or release first connecting member M1 (sixth rotating member m6).

Figure 20:
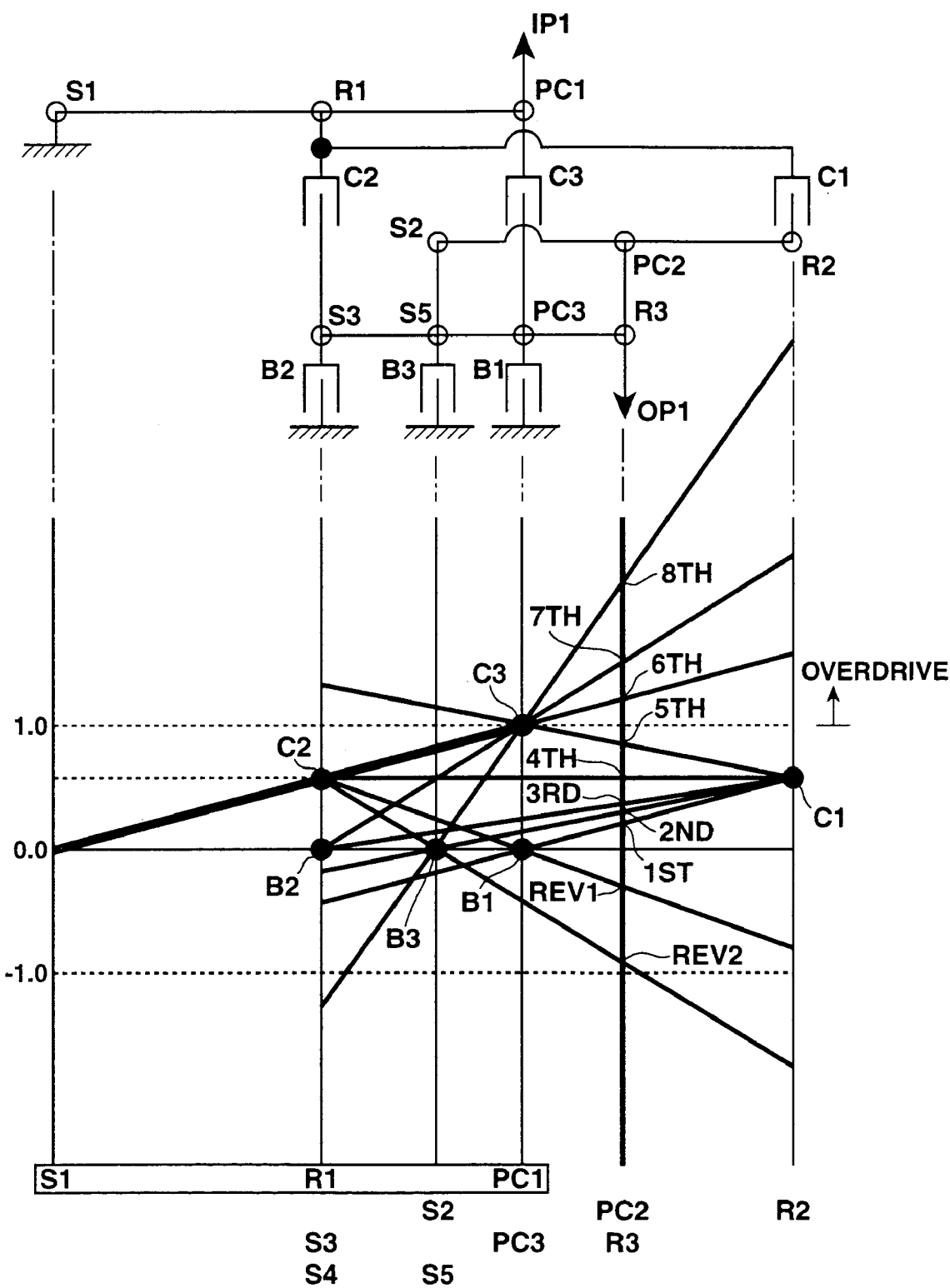
FIG. 20 is a collinear diagram of the multiple-speed automatic transmission of the third embodiment.

Referring now to FIGS. 2, and 20 through 24B, the following describes the operation of the multiple-speed automatic transmission of the third embodiment. FIG. 2, partly shared between the first and third embodiments, shows clutch engagements and brake applications required to establish various gear speeds. In FIG. 2, a solid circle in a cell indicates that the corresponding clutch or brake is applied in the corresponding speed, and a blank indicates that the corresponding clutch or brake is released in the corresponding speed. FIG. 20 shows the collinear diagram of the multiple-speed automatic transmission. The collinear diagram shows the rotation states of the rotating members in each speed. In FIG. 20, a bold line indicates the collinear diagram of first planetary gearset G1, and medium bold lines indicate the collinear diagrams of second planetary gearset G2 and third planetary gearset G3. The speed-shifting planetary gearset takes a rotation state determined by a combination of rotations of two of the six rotating members, where each of the six rotating members of the speed-shifting planetary gearset has a rotation speed that monotonously varies in order of first rotating member m1, second rotating member m2, third rotating member m3, sixth rotating member m6, and the two members of fourth rotating member m4 and fifth rotating member m5. FIGS. 21A to 24B show the power flow or the torque flow in each speed. In FIGS. 21A to 24B, the power flow through the clutches, the brakes, and the rotating members is indicated by bold lines, the power flow through the gears is indicated by a hatch pattern.

The first speed is established by engaging first clutch C1 and applying first brake B1, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with first brake B1 applied, center member CM is fixed to the transmission housing. With the rotation of third ring gear R3 or the output speed, fifth sun gear S5 rotates in the reverse direction at a reduced speed. Fifth sun gear S5 and second sun gear S2 of second planetary gearset G2 are solidly connected via first connecting member M1, so that the rotation speed of second sun gear S2 is the same as that of fifth sun gear S5. Accordingly, at second planetary gearset G2, second ring gear R2 rotates in the normal direction at a reduced speed and second sun gear S2 rotates in the reverse direction at a reduced speed. Therefore second planet-pinion carrier PC2 is forced to rotate at a speed further reduced from that of second ring gear R2, thereby outputs the rotation speed to output shaft OP2.

The collinear diagram of the multiple-speed automatic transmission as shown in FIG. 20 provides another analysis of the first speed. The point identified by C1 in the diagram, or the engagement point of first clutch C1 indicates the engagement of first clutch C1 with which the reduced speed is input to second ring gear R2 from first planetary gearset G1. A point identified by B1 in the diagram, or the application point of first brake B1 indicates the application of first brake B1 with which center member CM is held stationary. The operation of the speed-shifting planetary gearset is defined by the lever or straight line connecting the engagement point of first clutch C1 and the application point of first brake B1. The intersection point of the lever and the perpendicular line at output shaft OP2 indicates the output speed. In the first speed, the rotation speed of input shaft IP1 is reduced to a point identified by 1ST in the diagram through the multiple-speed automatic transmission, and output to output shaft OP2.

Figure 21A:
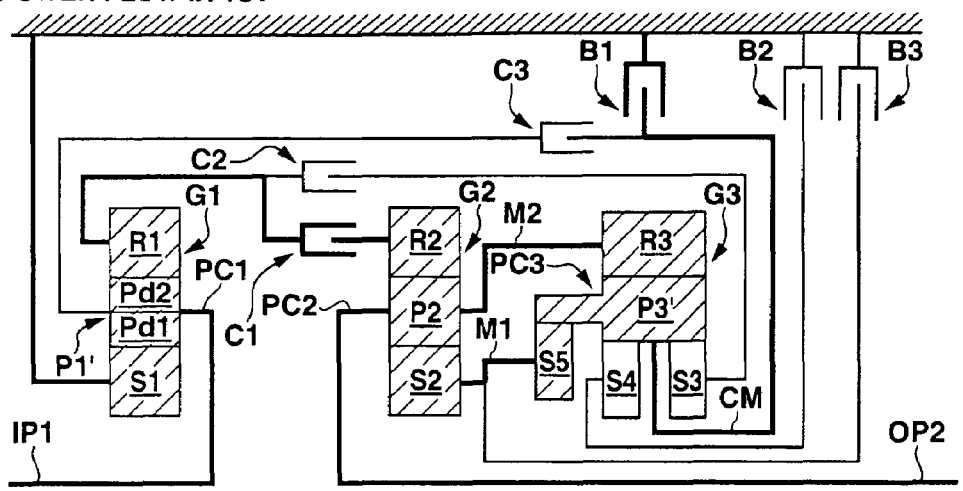
FIG. 21A is a schematic diagram depicting a power flow in the first speed of the multiple-speed automatic transmission of the third embodiment.

The power flow or torque flow in the first speed is shown in FIG. 21A. The power flows through first clutch C1, first brake B1, and the rotating members, as shown by bold lines, first planetary gearset G1, second planetary gearset G2, and third planetary gearset G3 except third sun gear S3 and fourth sun gear 54, as shown by a hatch pattern.

The second speed is established by releasing first brake B1 and applying third brake B3 to the operational state of the first speed, that is, by engaging first clutch C1 and applying third brake B3, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, with third brake B3 applied, second sun gear S2 is fixed to the transmission housing. Accordingly, at second planetary gearset G2, second ring gear R2 rotates in the normal direction at a reduced speed and second sun gear S2 is held stationary. Therefore second planet-pinion carrier PC2 and third ring gear R3 are forced to rotate at a speed further reduced from that of second ring gear R2, thereby output the rotation speed to output shaft OP2.

The collinear diagram of the multiple-speed automatic transmission as shown in FIG. 20 provides another analysis of the second speed. The point identified by C1 in the diagram, or the engagement point of first clutch C1 indicates the engagement of first clutch C1 with which the reduced speed is input to second ring gear R2 from first planetary gearset G1. The point identified by B3 in the diagram, or the application point of third brake B3 indicates the application of third brake B3 with which second sun gear S2 is held stationary. The operation of the speed-shifting planetary gearset is defined by the lever or straight line connecting the engagement point of first clutch C1 and the application point of third brake B3. The intersection point of the lever and the perpendicular line at output shaft OP2 indicates the output speed. In the second speed, the rotation speed of input shaft IP1 is reduced to a point identified by 2ND in the diagram through the multiple-speed automatic transmission, and output to output shaft OP2.

Figure 21B:
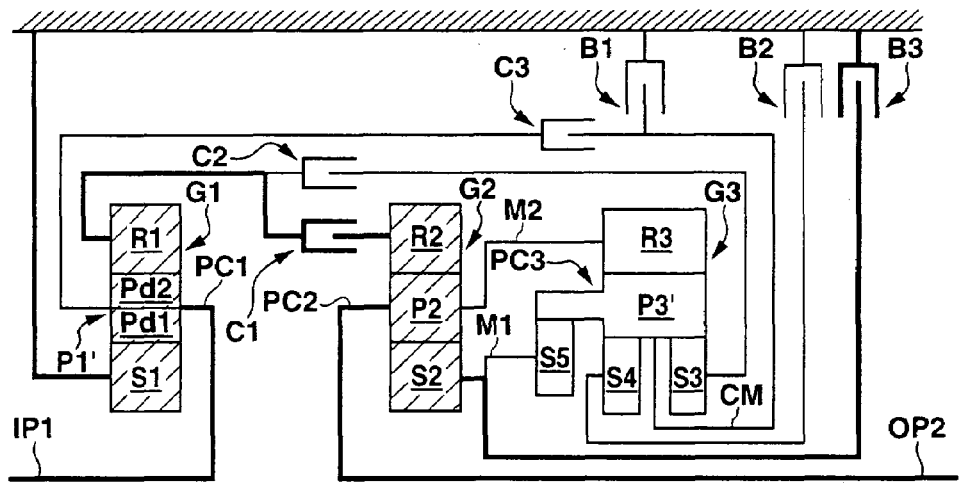
FIG. 21B is a schematic diagram depicting a power flow in the second speed of the multiple-speed automatic transmission of the third embodiment.

The power flow or torque flow in the second speed is shown in FIG. 21B. The power flows through first clutch C1, third brake B3, and the rotating members, as shown by bold lines, first planetary gearset G1, and second planetary gearset G2, as shown by a hatch pattern.

The third speed is established by releasing third brake B3 and applying second brake B2 to the operational state of the second speed, that is, by engaging first clutch C1 and applying second brake B2, as shown in FIG. 2. First, the rotation speed of input shaft IP1 is reduced at first planetary gearset G1. At second planetary gearset G2, with first clutch C1 engaged, the reduced speed is input to second ring gear R2 from first planet-pinion carrier PC1 of first planetary gearset G1. On the other hand, at third planetary gearset G3, with second brake B2 applied, fourth sun gear S4 is fixed to the transmission housing. Third planet pinion P3', which is stepped and is meshed with fourth sun gear S4 and fifth sun gear S5, rotates fifth sun gear S5 according to the gear ratio difference between the stepped gears of third planet pinion P3'. Furthermore, second sun gear S2, solidly connected with fifth sun gear S5 via first connecting member M1, rotates at the same speed as that of fifth sun gear S5. Accordingly, at second planetary gearset G2, second ring gear R2 rotates at a reduced speed and second sun gear S2 rotates at a reduced speed. Therefore second planet-pinion carrier PC2 is forced to rotate at a speed further reduced from that of second ring gear R2, thereby outputs the rotation speed to output shaft OP2.

The collinear diagram of the multiple-speed automatic transmission as shown in FIG. 20 provides another analysis of the third speed. The point identified by C1 in the diagram, or the engagement point of first clutch C1 indicates the engagement of first clutch C1 with which the reduced speed is input to second ring gear R2 from first planetary gearset G1. The point identified by B2 in the diagram, or the application point of second brake B2 indicates the application of second brake B2 with which fourth sun gear S4 is held stationary. The operation of the speed-shifting planetary gearset is defined by the lever or straight line connecting the engagement point of first clutch C1 and the application point of second brake B2. The intersection point of the lever and the perpendicular line at output shaft OP2 indicates the output speed. In the third speed, the rotation speed of input shaft IP1 is reduced to a point identified by 3RD in the diagram (faster than the second speed) through the multiple-speed automatic transmission, and output to output shaft OP2.

Figure 21C:
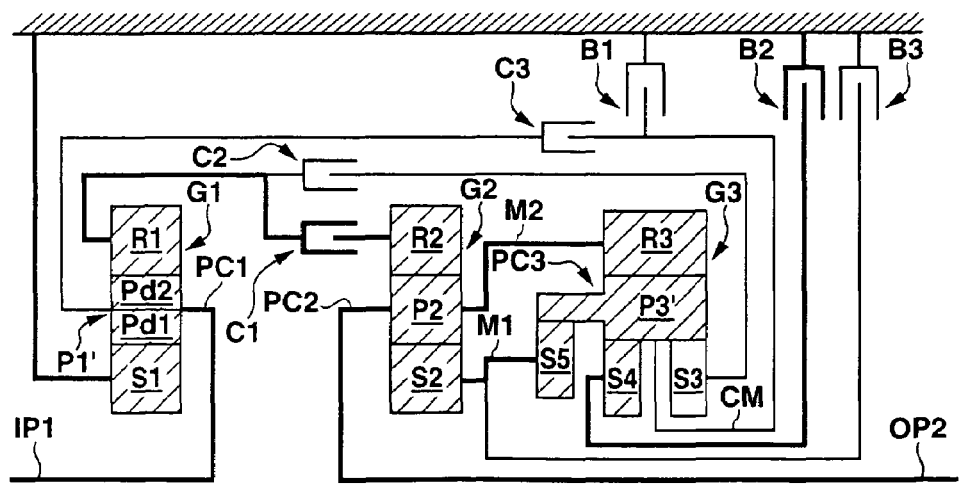
FIG. 21C is a schematic diagram depicting a power flow in the third speed of the multiple-speed automatic transmission of the third embodiment.

The power flow or torque flow in the second speed is shown in FIG. 21C. The power flows through first clutch C1, second brake B2, and the rotating members, as shown by bold lines, first planetary gearset G1, second planetary gearset G2, and third planetary gearset G3, as shown by a hatch pattern.

The fourth speed is established by releasing second brake B2 and engaging second clutch C2 to the operational state of the third speed, that is, by engaging first clutch C1 and second clutch C2, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. At the same time, with second clutch C2 engaged, the reduced speed is input to third sun gear S3 from first ring gear R1 of first planetary gearset G1. Accordingly, second planetary gearset G2 and third planetary gearset G3 both rotate at the same reduced speed, that is, solidly. Therefore second planet-pinion carrier PC2 is forced to rotate at the reduced speed that is reduced at first planetary gearset G1, thereby outputs the rotation speed to output shaft OP2.

The collinear diagram of the multiple-speed automatic transmission as shown in FIG. 20 provides another analysis of the fourth speed. The point identified by C1 in the diagram, or the engagement point of first clutch C1 indicates the engagement of first clutch C1 with which the reduced speed is input to second ring gear R2 from first planetary gearset G1. Similarly, the point identified by C2 in the diagram, or the engagement point of second clutch C2 indicates the engagement of second clutch C2 with which the reduced speed is input to third sun gear S3 from first planetary gearset G1. The operation of the speed-shifting planetary gearset is defined by the lever or straight line connecting the engagement point of first clutch C1 and the engagement point of second clutch C2. The intersection point of the lever and the perpendicular line at output shaft OP2 indicates the output speed. In the fourth speed, the rotation speed of input shaft IP1 is reduced to a point identified by 4TH in the diagram (to the gear ratio of first planetary gearset G1) through the multiple-speed automatic transmission, and output to output shaft OP2.

Figure 22A:
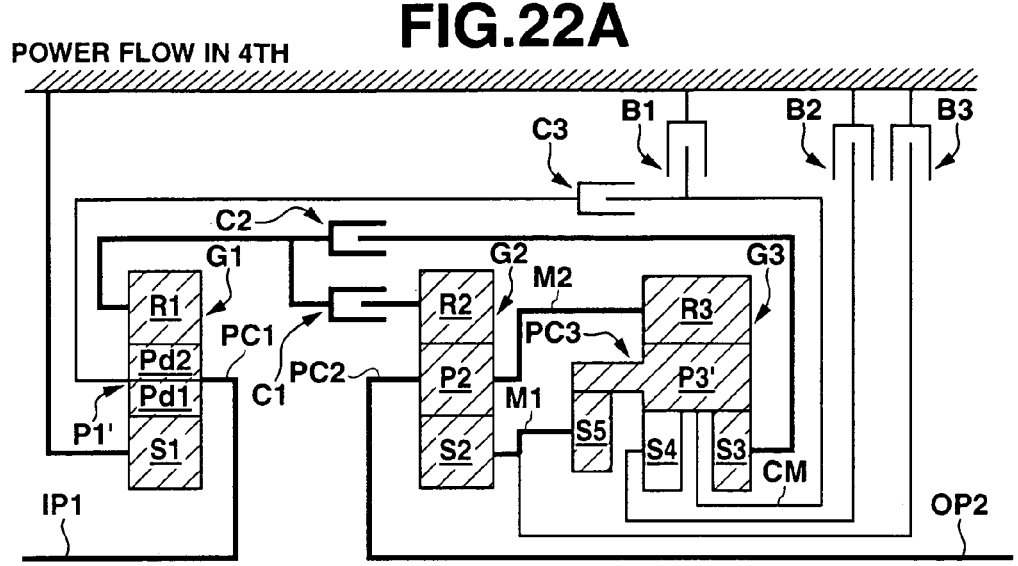
FIG. 22A is a schematic diagram depicting a power flow in the fourth speed of the multiple-speed automatic transmission of the third embodiment.

The power flow or torque flow in the second speed is shown in FIG. 22A. The power flows through first clutch C1, second clutch C2, and the rotating members, as shown by bold lines, first planetary gearset G1, second planetary gearset G2, and third planetary gearset G3 except fourth sun gear S4, as shown by a hatch pattern.

The fifth speed is established by disengaging second clutch C2 and engaging third clutch C3 to the operational state of the fourth speed, that is, by engaging first clutch C1 and third clutch C3, as shown in FIG. 2. First, the rotation speed of input shaft IP1 is reduced at first planetary gearset G1. At second planetary gearset G2, with first clutch C1 engaged, the reduced speed is input to second ring gear R2 from first ring gear R1 of first planetary gearset G1. On the other hand, at third planetary gearset G3, with third clutch C3 engaged, the input rotation of input shaft IP1 is input to center member CM via first planet-pinion carrier PC1 of first planetary gearset G1. Accordingly, with the rotation of third ring gear R3 or the output speed, fifth sun gear S5 rotates at a speed increased faster than that of third ring gear R3. Fifth sun gear S5 and second sun gear S2 of second planetary gearset G2 are solidly connected via first connecting member M1, so that the rotation speed of second sun gear S2 is the same as that of fifth sun gear S5. Accordingly, at second planetary gearset G2, second ring gear R2 rotates at a reduced speed and second sun gear S2 rotates at the faster speed. Therefore second planet-pinion carrier PC2 is forced to rotate at a speed increased from the speed reduced at first planetary gearset G1 (but slower than the input speed), thereby outputs the rotation speed to output shaft OP2.

The collinear diagram of the multiple-speed automatic transmission as shown in FIG. 20 provides another analysis of the fifth speed. The point identified by C1 in the diagram, or the engagement point of first clutch C1 indicates the engagement of first clutch C1 with which the reduced speed is input to second ring gear R2 from first planetary gearset G1. Similarly, the point identified by C3 in the diagram, or the engagement point of third clutch C3 indicates the engagement of third clutch C3 with which the input speed is input to center member CM from input shaft IP1 via first planet-pinion carrier PC1. The operation of the speed-shifting planetary gearset is defined by the lever or straight line connecting the engagement point of first clutch C1 and the engagement point of third clutch C3. The intersection point of the lever and the perpendicular line at output shaft OP2 indicates the output speed. In the fifth speed, the rotation speed of input shaft IP1 is reduced slightly to a point identified by 5TH in the diagram through the multiple-speed automatic transmission, and output to output shaft OP2.

Figure 22B:
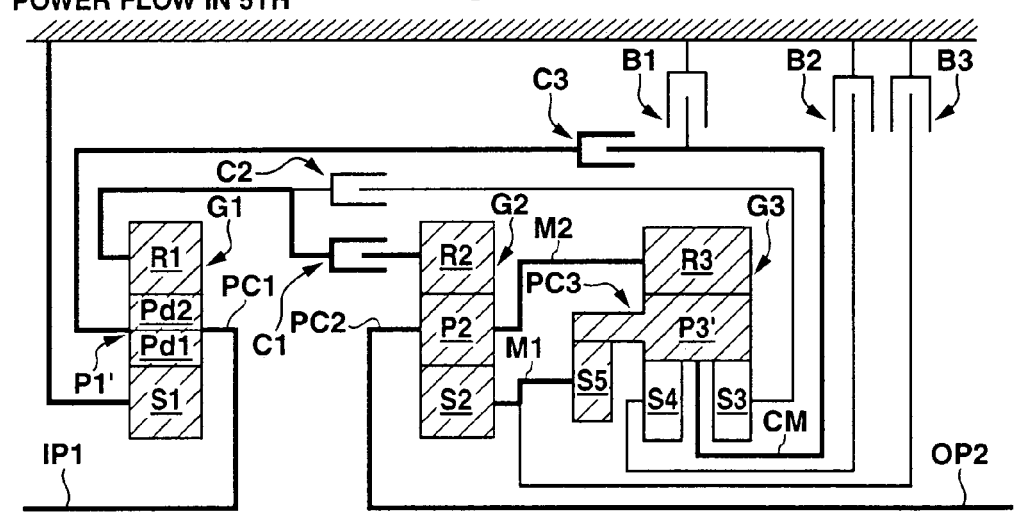
FIG. 22B is a schematic diagram depicting a power flow in the fifth speed of the multiple-speed automatic transmission of the third embodiment.

The power flow or torque flow in the fifth speed is shown in FIG. 22B. The power flows through first clutch C1, third clutch C3, and the rotating members, as shown by bold lines, first planetary gearset G1, second planetary gearset G2, and third planetary gearset G3 except third sun gear S3 and fourth sun gear S4, as shown by a hatch pattern.

The sixth speed is established by disengaging first clutch C1 and engaging second clutch C2 to the operational state of the fifth speed, that is, by engaging second clutch C2 and third clutch C3, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1. At the same time, with third clutch C3 engaged, the input rotation of input shaft IP1 is input to center member CM via first planet-pinion carrier PC1 of first planetary gearset G1. Accordingly, at third planetary gearset G3, center member CM rotates at the input speed and third sun gear S3 rotates at the speed reduced at first planetary gearset G1. Therefore third ring gear R3 is forced to rotate at a speed increased faster than the input speed, thereby outputs the increased rotation speed via second connecting member M2 to output shaft OP2.

The collinear diagram of the multiple-speed automatic transmission as shown in FIG. 20 provides another analysis of the sixth speed. The point identified by C2 in the diagram, or the engagement point of second clutch C2 indicates the engagement of second clutch C2 with which the reduced speed is input to third sun gear S3 from first planetary gearset G1. Similarly, the point identified by C3 in the diagram, or the engagement point of third clutch C3 indicates the engagement of third clutch C3 with which the input speed is input to center member CM from input shaft IP1. The operation of the speed-shifting planetary gearset is defined by the lever or straight line connecting the engagement point of second clutch C2 and the engagement point of third clutch C3. The intersection point of the lever and the perpendicular line at output shaft OP2 indicates the output speed. In the sixth speed, the rotation speed of input shaft IP1 is increased slightly to a point identified by 6TH in the diagram through the multiple-speed automatic transmission, and output to output shaft OP2.

Figure 22C:
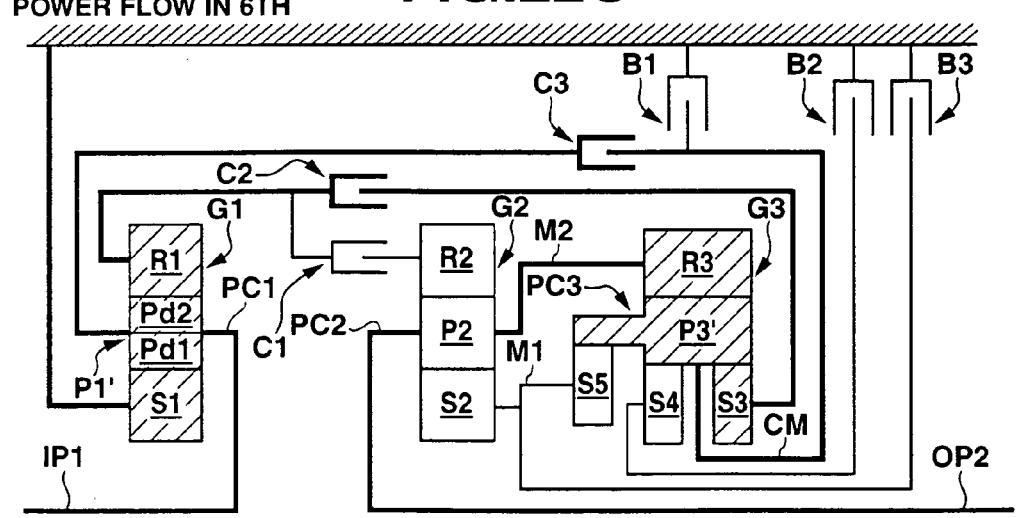
FIG. 22C is a schematic diagram depicting a power flow in the sixth speed of the multiple-speed automatic transmission of the third embodiment.

The power flow or torque flow in the sixth speed is shown in FIG. 22C. The power flows through second clutch C2, third clutch C3, and the rotating members, as shown by bold lines, first planetary gearset G1 and third planetary gearset G3 except fourth sun gear 54 and fifth sun gear S5, as shown by a hatch pattern.

The seventh speed is established by disengaging second clutch C2 and applying second brake B2 to the operational state of the sixth speed, that is, by engaging third clutch C3 and applying second brake B2, as shown in FIG. 2. With third clutch C3 engaged, the input rotation speed of input shaft IP1 is input to center member CM of third planetary gearset G3 via first planet-pinion carrier PC1 of first planetary gearset G1. On the other hand, with second brake B2 applied, fourth sun gear S4 of third planetary gearset G3 is held stationary to the transmission housing. Accordingly, at third planetary gearset G3, center member CM rotates at the input speed and fourth sun gear S4 is stationary to the transmission housing. Therefore third ring gear R3 is forced to rotate at a speed increased faster than the input speed, thereby outputs the rotation speed via second connecting member M2 to output shaft OP2.

The collinear diagram of the multiple-speed automatic transmission as shown in FIG. 20 provides another analysis of the seventh speed. The point identified by C3 in the diagram, or the engagement point of third clutch C3 indicates the engagement of third clutch C3 with which the input speed is input to center member CM from input shaft IP1. The point identified by B2 in the diagram, or the application of second brake B2 indicates the application of second brake B2 with which fourth sun gear S4 is held stationary. The operation of the speed-shifting planetary gearset is defined by the lever or straight line connecting the engagement point of third clutch C3 and the application point of second brake B2. The intersection point of the lever and the perpendicular line at output shaft OP2 indicates the output speed. In the seventh speed, the rotation speed of input shaft IP1 is increased to a point identified by 7TH in the diagram through the multiple-speed automatic transmission, and output to output shaft OP2.

Figure 23A:
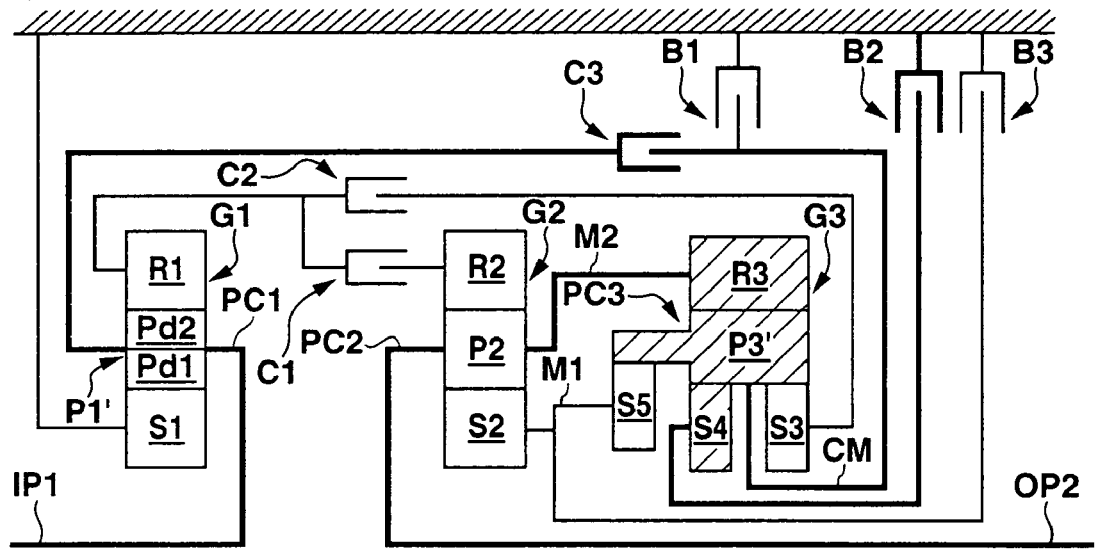
FIG. 23A is a schematic diagram depicting a power flow in the seventh speed of the multiple-speed automatic transmission of the third embodiment.

The power flow or torque flow in the seventh speed is shown in FIG. 23A. The power flows through third clutch C3, second brake B2, and the rotating members, as shown by bold lines, third planetary gearset G3 except third sun gear S3 and fifth sun gear S5, as shown by a hatch pattern.

The eighth speed is established by releasing second brake B2 and applying third brake B3 to the operational state of the seventh speed, that is, by engaging third clutch C3 and applying third brake B3, as shown in FIG. 2. With third clutch C3 engaged, the input rotation speed of input shaft IP1 is input to center member CM of third planetary gearset G3 via first planet-pinion carrier PC1. On the other hand, with third brake B3 applied, fifth sun gear S5 of third planetary gearset G3 is held stationary to the transmission housing. Accordingly, at third planetary gearset G3, center member CM rotates at the input speed and fifth sun gear S5 is stationary to the transmission housing. Therefore third ring gear R3 is forced to rotate at a speed defined and increased faster than the input speed by the rotations of third sun gear S3 and center member CM, thereby outputs the rotation speed via second connecting member M2 to output shaft OP2.

The collinear diagram of the multiple-speed automatic transmission as shown in FIG. 20 provides another analysis of the eighth speed. The point identified by C3 in the diagram, or the engagement point of third clutch C3 indicates the engagement of third clutch C3 with which the input speed is input to center member CM from input shaft IP1. The point identified by B3 in the diagram, or the application point of third brake B3 indicates the application of third brake B3 with which fifth sun gear S5 is held stationary to the transmission housing. The operation of the speed-shifting planetary gearset is defined by the lever or straight line connecting the engagement point of third clutch C3 and the application point of third brake B3. The intersection point of the lever and the perpendicular line at output shaft OP2 indicates the output speed. In the eighth speed, the rotation speed of input shaft IP1 is increased to a point identified by 8TH in the diagram through the multiple-speed automatic transmission, and output to output shaft OP2.

Figure 23B:
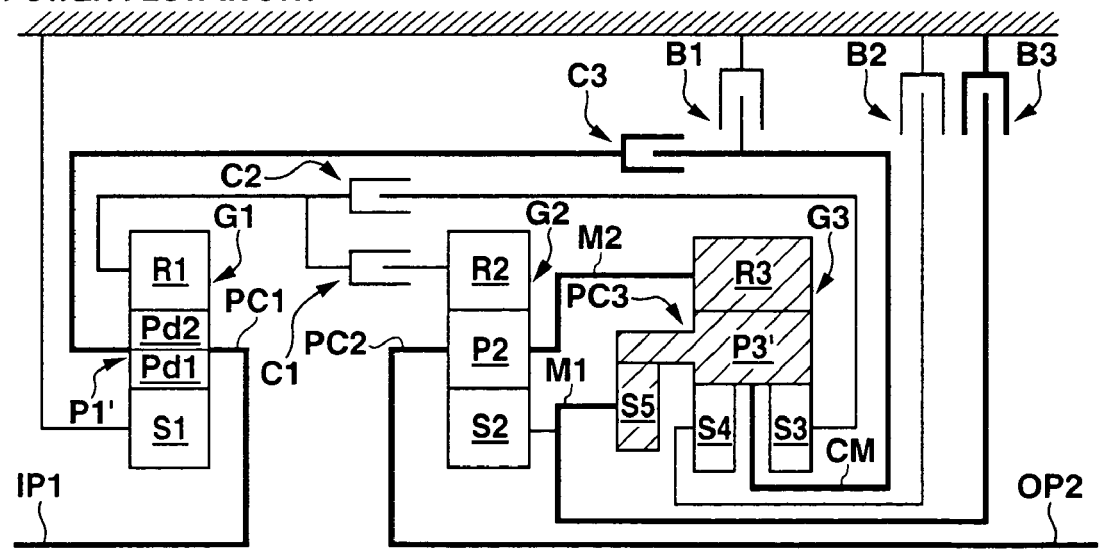
FIG. 23B is a schematic diagram depicting a power flow in the eighth speed of the multiple-speed automatic transmission of the third embodiment.

The power flow or torque flow in the eighth speed is shown in FIG. 23B. The power flows through third clutch C3, third brake B3, and the rotating members, as shown by bold lines, third planetary gearset G3 third sun gear S3 and except fourth sun gear S4, as shown by a hatch pattern.

The first reverse speed is established by engaging second clutch C2 and applying first brake B1, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1. On the other hand, with first brake B1 applied, center member CM is fixed to the transmission housing. Accordingly, at third planetary gearset G3, third sun gear S3 rotates in the normal direction at the reduced speed and center member CM is held stationary to the transmission housing. Therefore third ring gear R3 is forced to rotate in the reverse direction at a reduced speed, thereby outputs the rotation speed via second connecting member M2 to output shaft OP2.

The collinear diagram of the multiple-speed automatic transmission as shown in FIG. 20 provides another analysis of the first reverse speed. The point identified by C2 in the diagram, or the engagement point of second clutch C2 indicates the engagement of second clutch C2 with which the reduced speed is input to third sun gear S3 from first planetary gearset G1. The point identified by B1 in the diagram, or the application point of first brake B1 indicates the application of first brake B1 with which center member CM is held stationary. The operation of the speed-shifting planetary gearset is defined by the lever or straight line connecting the engagement point of second clutch C2 and the application point of first brake B1. The intersection point of the lever and the perpendicular line at output shaft OP2 indicates the output speed. In the first reverse speed, the rotation speed of input shaft IP1 is reduced to a point identified by REV1 in the diagram through the multiple-speed automatic transmission, and is output to output shaft OP2.

Figure 24A:
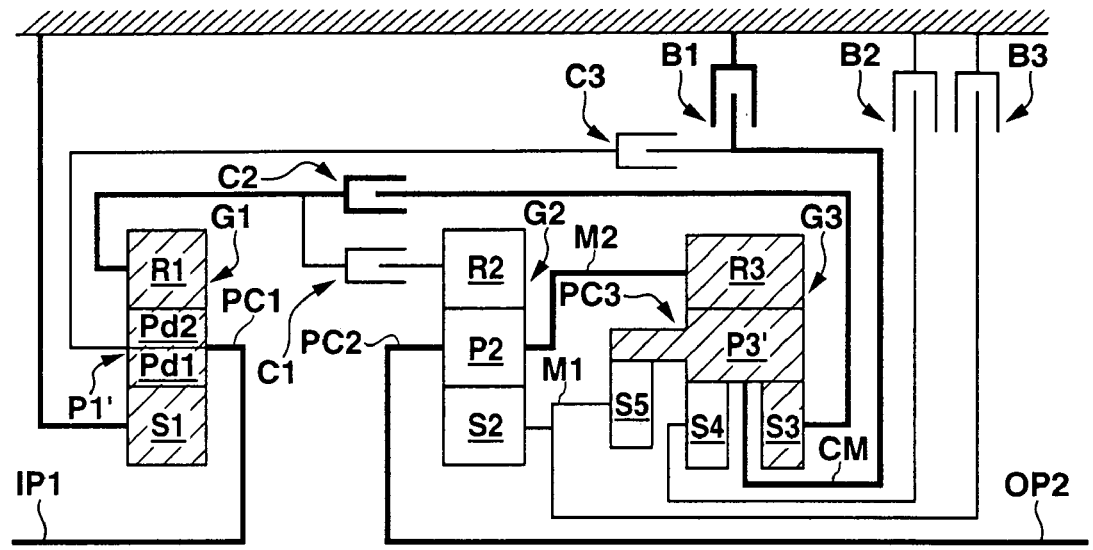
FIG. 24A is a schematic diagram depicting a power flow in the first reverse speed of the multiple-speed automatic transmission of the third embodiment.

The power flow or torque flow in the first reverse speed is shown in FIG. 24A. The power flows through second clutch C2, first brake B1, and the rotating members, as shown by bold lines, first planetary gearset G1 and third planetary gearset G3 except fourth sun gear S4 and fifth sun gear S5, as shown by a hatch pattern.

The second reverse speed is established by releasing first brake B1 and applying third brake B3 to the operational state of the first reverse speed, that is, by engaging second clutch C2 and applying third brake B3, as shown in FIG. 2. First, the rotation speed of input shaft IP1 is reduced at first planetary gearset G1. With second clutch C2 engaged, the reduced speed is input to third sun gear S3 from first ring gear R1 of first planetary gearset G1. On the other hand, with third brake B3 applied, fifth sun gear S5 is fixed to the transmission housing. Accordingly, at third planetary gearset G3, third sun gear S3 rotates in the normal direction at the reduced speed and fifth sun gear S5 is held stationary to the transmission housing. This defines the rotation of center member CM. Therefore third ring gear R3 is forced to rotate in the reverse direction at a reduced speed (faster than that of the first reverse speed) defined by the rotations of third sun gear S3 and center member CM, thereby outputs the rotation speed via second connecting member M2 to output shaft OP2.

The collinear diagram of the multiple-speed automatic transmission as shown in FIG. 20 provides another analysis of the second reverse speed. The point identified by C2 in the diagram, or the engagement point of second clutch C2 indicates the engagement of second clutch C2 with which the reduced speed is input to third sun gear S3 from first planetary gearset G1. The point identified by B3 in the diagram, or the application point of third brake B3 indicates the application of third brake B3 with which fifth sun gear S5 is held stationary. The operation of the speed-shifting planetary gearset is defined by the lever or straight line connecting the engagement point of second clutch C2 and the application point of third brake B3. The intersection point of the lever and the perpendicular line at output shaft OP2 indicates the output speed. In the second reverse speed, the rotation speed of input shaft IP1 is reduced to a point identified by REV2 in the diagram through the multiple-speed automatic transmission, and output to output shaft OP2.

Figure 24B:
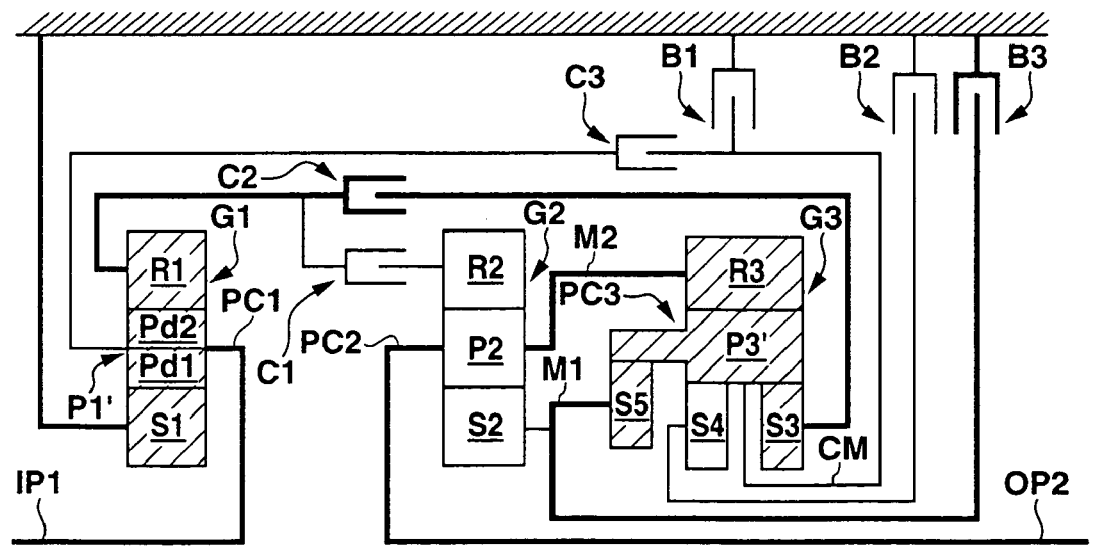
FIG. 24B is a schematic diagram depicting a power flow in the second reverse speed of the multiple-speed automatic transmission of the third embodiment.

The power flow or torque flow in the second reverse speed is shown in FIG. 24B. The power flows through second clutch C2, third brake B3, and the rotating members, as shown by bold lines, first planetary gearset G1 and third planetary gearset G3 except fourth sun gear S4, as shown by a hatch pattern.

Figure 26:
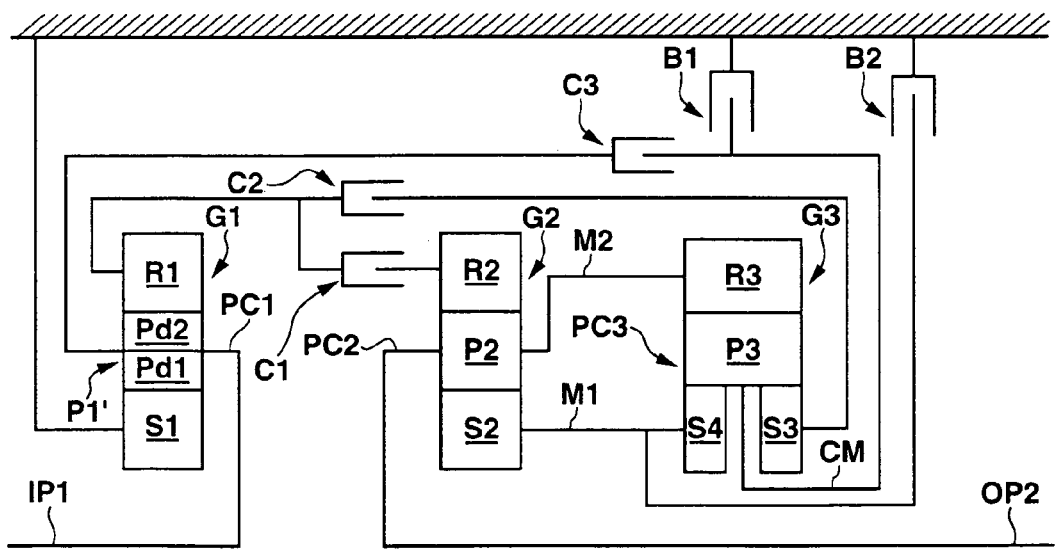
FIG. 26 is a schematic diagram depicting a six-speed automatic transmission as a basic structure for the eight-speed automatic transmission of the third embodiment.

The multiple-speed automatic transmission of the third embodiment is constructed and operated as discussed above. The following describes the comparison between the multiple-speed automatic transmission of the third embodiment and the corresponding six-speed automatic transmission that serves for the basic structure of the multiple-speed automatic transmission of the third embodiment. Referring now to FIG. 26, there is shown the six-speed automatic transmission. Elements in common are designated by the same reference signs. The six-speed automatic transmission includes three planetary gearsets G1, G2, and G3, three clutches C1 through C3, and two brakes B1 and B2. The difference is that the multiple-speed automatic transmission includes additional elements of the stepped portion of third planet pinion P3' and fifth sun gear S5 of third planetary gearset G3, and third brake B3. In other words, simply adding the stepped portion of third planet pinion P3' and fifth sun gear S5 of third planetary gearset G3, and third brake B3 serves for multiplication of gear speeds from the six-speed automatic transmission to the eight-speed automatic transmission of the first embodiment.

In the collinear diagram, as shown in FIG. 20, the gear ratio of the elements of second sun gear S2 and fifth sun gear S5 connected to third brake B3 is additionally provided between the gear ratio of the elements of first ring gear R1, third sun gear S3, and fourth sun gear S4, and the gear ratio of the elements of first planet-pinion carrier PC1 and third planet-pinion carrier PC3. With third brake B3 applied, different gear ratios are defined in addition to that of the corresponding six-speed automatic transmission.

The multiple-speed automatic transmission of the third embodiment provides effects (E1), (E2), (E3), and (E5), as described above in the first and second embodiments.

The gearbox of the present invention, which is applied to the multiple-speed automatic transmission in the embodiments, may be applied to other types of transmissions, such as a manual transmission.

The entire contents of Japanese Patent Application No. 2003-158796 (filed Jun. 4, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A multiple-speed transmission for an automotive vehicle comprising:
    an input section;
    an output section;
    a speed-reducing planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation;
    a speed-shifting planetary gearset including a first rotating member, a second rotating member drivingly connected to the output section, a third rotating member, a fourth rotating member, a fifth rotating member, and a sixth rotating member, for taking a rotation state determined by a combination of rotations of two of the six rotating members of the speed-shifting planetary gearset, where each of the six rotating members of the speed-shifting planetary gearset has a rotation speed that monotonously varies in order of the first rotating member, the second rotating member, the third rotating member, the sixth rotating member, and the two members of the fourth rotating member and the fifth rotating member;
    a first clutch for selectively drivingly connecting and disconnecting the first rotating element of the speed-reducing planetary gearset and the first rotating member of the speed-shifting planetary gearset;
    a second clutch for selectively drivingly connecting and disconnecting the first rotating element of the speed-reducing planetary gearset and the fourth rotating member of the speed-shifting planetary gearset;
    a third clutch for selectively drivingly connecting and disconnecting the second rotating element of the speed-reducing planetary gearset and the third rotating member of the speed-shifting planetary gearset;
    a first brake operable to hold selectively against rotation the third rotating member of the speed-shifting planetary gearset;
    a second brake operable to hold selectively against rotation the fifth rotating member of the speed-shifting planetary gearset; and
    a third brake operable to hold selectively against rotation the sixth rotating member of the speed-shifting planetary gearset.

2. The multiple-speed transmission as claimed in claim 1, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

3. A multiple-speed transmission for an automotive vehicle comprising:
- an input section;
- an output section;
- a first planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation;
- a second planetary gearset including a second sun gear, a second ring gear, a second planet-pinion carrier, and a second planet pinion rotatably supported on the second planet-pinion carrier and meshed with the second sun gear and the second ring gear;
- a third planetary gearset having a third sun gear connected to the second sun gear, a fourth sun gear, a third ring gear connected to the second planet-pinion carrier and the output section, a fourth ring gear, a third planet-pinion carrier including a center member between the third sun gear and the fourth sun gear, a third planet pinion rotatably supported on the third planet-pinion carrier and meshed with the third sun gear, the fourth sun gear, and the third ring gear, and a fourth planet pinion rotatably supported on the third planet-pinion carrier and meshed with the third planet pinion and the fourth ring gear;
- a first clutch for selectively drivingly connecting and disconnecting the first rotating element of the first planetary gearset and the second ring gear;
- a second clutch for selectively drivingly connecting and disconnecting the first rotating element of the first planetary gearset and at least one of the second sun gear and the third sun gear;
- a third clutch for selectively drivingly connecting and disconnecting the second rotating element of the first planetary gearset and the third planet-pinion carrier via the center member;
- a first brake operable to hold selectively against rotation the third planet-pinion carrier;
- a second brake operable to hold selectively against rotation the fourth sun gear; and
- a third brake operable to hold selectively against rotation the fourth ring gear.

4. The multiple-speed transmission as claimed in claim 3, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

5. The multiple-speed transmission as claimed in claim 3, wherein:
the first planetary gearset comprises:
- a first sun gear serving as the third rotating element;
- a first planet-pinion carrier serving as the first rotating element;
- a first ring gear drivingly connected to the input section and serving as the second rotating element;
- a first planet pinion rotatably supported on the first planet-pinion carrier and meshed with the first sun gear and the first ring gear;

the second planetary gearset is placed between the first planetary gearset and the third planetary gearset; and
the fourth sun gear and the fourth ring gear are placed at a farer side from the second planetary gearset than the third sun gear and the third ring gear.

6. The multiple-speed transmission as claimed in claim 3, wherein:
the first planetary gearset comprises:
- a first sun gear serving as the third rotating element;
- a first ring gear serving as the first rotating element;
- a first planet-pinion carrier drivingly connected to the input section and serving as the second rotating element;
- a first pinion rotatably supported on the first planet-pinion carrier and meshed with the first sun gear; and
- a second pinion rotatably supported on the first planet-pinion carrier and meshed with the first pinion and the first ring gear.

7. The multiple-speed transmission as claimed in claim 6, wherein:
the third planetary gearset is placed between the first planetary gearset and the second planetary gearset; and
the fourth sun gear and the fourth ring gear are placed at a farer side from the second planetary gearset than the third sun gear and the third ring gear.

8. A multiple-speed transmission for an automotive vehicle comprising:
- an input section;
- an output section;
- a first planetary gearset including a first rotating element having a first primary speed ratio slower than the input section, a second rotating element drivingly connected to the input section and having a second primary speed ratio faster than the first primary speed ratio in the same direction as the first rotating element, and a third rotating element held against rotation;
- a second planetary gearset including a second sun gear, a second ring gear, a second planet-pinion carrier connected to the output section, and a second planet pinion rotatably supported on the second planet-pinion carrier and meshed with the second sun gear and the second ring gear;
- a third planetary gearset having a third sun gear, a fourth sun gear, a fifth sun gear connected to the second sun gear, a third ring gear connected to the second planet-pinion carrier, a third planet-pinion carrier including a center member between the third sun gear and the fourth sun gear, and a third planet pinion rotatably supported on the third planet-pinion carrier;
- the third planet pinion formed of two portions with different diameters, and meshed with the fifth sun gear at one portion with a smaller diameter, and third sun gear, the fourth sun gear, and the third ring gear at the other portion;

a first clutch for selectively drivingly connecting and disconnecting the first rotating element of the first planetary gearset and the second ring gear;

a second clutch for selectively drivingly connecting and disconnecting the first rotating element of the first planetary gearset and the third sun gear;

a third clutch for selectively drivingly connecting and disconnecting the second rotating element of the first planetary gearset and the third planet-pinion carrier via the center member;

a first brake operable to hold selectively against rotation the third planet-pinion carrier;

a second brake operable to hold selectively against rotation the fourth sun gear; and a third brake operable to hold selectively against rotation the second sun gear and the fifth sun gear.

9. The multiple-speed transmission as claimed in claim 8, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

10. The multiple-speed transmission as claimed in claim 8, wherein:
    the first planetary gearset comprises:
        a first sun gear serving as the third rotating element;
        a first ring gear serving as the first rotating element;
        a first planet-pinion carrier drivingly connected to the input section and serving as the second rotating element;
        a first pinion rotatably supported on the first planet-pinion carrier and meshed with the first sun gear; and
        a second pinion rotatably supported on the first planet-pinion carrier and meshed with the first pinion and the first ring gear;
    the second planetary gearset is placed between the first planetary gearset and the third planetary gearset; and
    the sun gears of the third planetary gearset are placed in order of the fifth sun gear, the fourth sun gear, and the third sun gear from the side of the second planetary gearset.

11. A multiple-speed transmission for an automotive vehicle comprising:

input means for receiving an input power;

output means for outputting a transmitted power;

speed-reducing means for including a first rotating element having a first primary speed ratio slower than the input means, a second rotating element drivingly connected to the input means and having a second primary speed ratio faster than the first primary speed ratio in the same direction as the first rotating element, and a third rotating element held against rotation;

speed-shifting means for including a first rotating member, a second rotating member drivingly connected to the output means, a third rotating member, a fourth rotating member, a fifth rotating member, and a sixth rotating member, for taking a rotation state determined by a combination of rotations of two of the six rotating members of the speed-shifting means, where each of the six rotating members of the speed-shifting means has a rotation speed that monotonously varies in order of the first rotating member, the second rotating member, the third rotating member, the sixth rotating member, and the two members of the fourth rotating member and the fifth rotating member;

first torque transmitting means for selectively drivingly connecting and disconnecting the first rotating element of the speed-reducing means and the first rotating member of the speed-shifting means;

second torque transmitting means for selectively drivingly connecting and disconnecting the first rotating element of the speed-reducing means and the fourth rotating member of the speed-shifting means;

third torque transmitting means for selectively drivingly connecting and disconnecting the second rotating element of the speed-reducing means and the third rotating member of the speed-shifting means;

fourth torque transmitting means for holding selectively against rotation the third rotating member of the speed-shifting means;

fifth torque transmitting means for holding selectively against rotation the fifth rotating member of the speed-shifting means; and sixth torque transmitting means for holding selectively against rotation the sixth rotating member of the speed-shifting means.

* * * * *